(12) United States Patent
Takano et al.

(10) Patent No.: US 6,705,972 B1
(45) Date of Patent: Mar. 16, 2004

(54) EXERCISE SUPPORT INSTRUMENT

(75) Inventors: Toshiya Takano, Hokkaido (JP); Yutaka Nagayama, Hokkaido (JP); Takahiko Demura, Hokkaido (JP)

(73) Assignee: Hudson Co., Ltd., Hokkaido (JP)

( * ) Notice: Subject to any disclaimer, the term of this patent is extended or adjusted under 35 U.S.C. 154(b) by 0 days.

(21) Appl. No.: 09/485,423
(22) PCT Filed: Jul. 15, 1998
(86) PCT No.: PCT/JP98/03167
§ 371 (c)(1), (2), (4) Date: Jun. 16, 2000
(87) PCT Pub. No.: WO99/08252
PCT Pub. Date: Feb. 18, 1999

(30) Foreign Application Priority Data

Aug. 8, 1997 (JP) ............................................. 9-225599

(51) Int. Cl.⁷ .............................................. A63B 21/00
(52) U.S. Cl. ............................................... 482/8; 482/7
(58) Field of Search ........................... 482/1–9, 51, 54, 482/67, 900–902

(56) References Cited

U.S. PATENT DOCUMENTS 5,478,295 A * 12/1995 Fracchia ........................ 482/7
5,527,239 A * 6/1996 Abbondanza ................... 482/8
6,244,988 B1 * 6/2001 Delman .......................... 482/8

FOREIGN PATENT DOCUMENTS

| JP | 3-48489 | 3/1991 |
| JP | 5-332783 | 12/1993 |
| JP | 7-16971 | 1/1995 |
| JP | 7-160853 | 6/1995 |
| JP | 7-181056 | 7/1995 |
| JP | 8-103568 | 4/1996 |
| JP | 3048489 | 2/1998 |

OTHER PUBLICATIONS

Tamagotchi manual (printed in 1997).

* cited by examiner

Primary Examiner—Glenn E. Richman
(74) Attorney, Agent, or Firm—Katten Muchin Zavis Rosenman

(57) ABSTRACT

An exercise assisting meter that enables the user to enjoy physical exercises and to perform a proper long-term management of exercises by enumerating the amount of repetitive exercises of the user and displaying the result of assessment on the exercises with an image information (character) of virtual organism representing different assessment grades. This meter manages the days of practice from the start of an exercise and makes the character evolve or grow as the days go on. Further, it increases or decreases a life-gauge for managing the healthy state of a character according to daily target achievement existence, and changes the figure (shape of body) of the character to a healthy, obese or sick form according to the life-gauge. Further, it includes a wellness meter for managing the wellness of the character according to the rate of target achievement on the previous day, and changes the expression and action of the character according to the wellness meter.

17 Claims, 24 Drawing Sheets

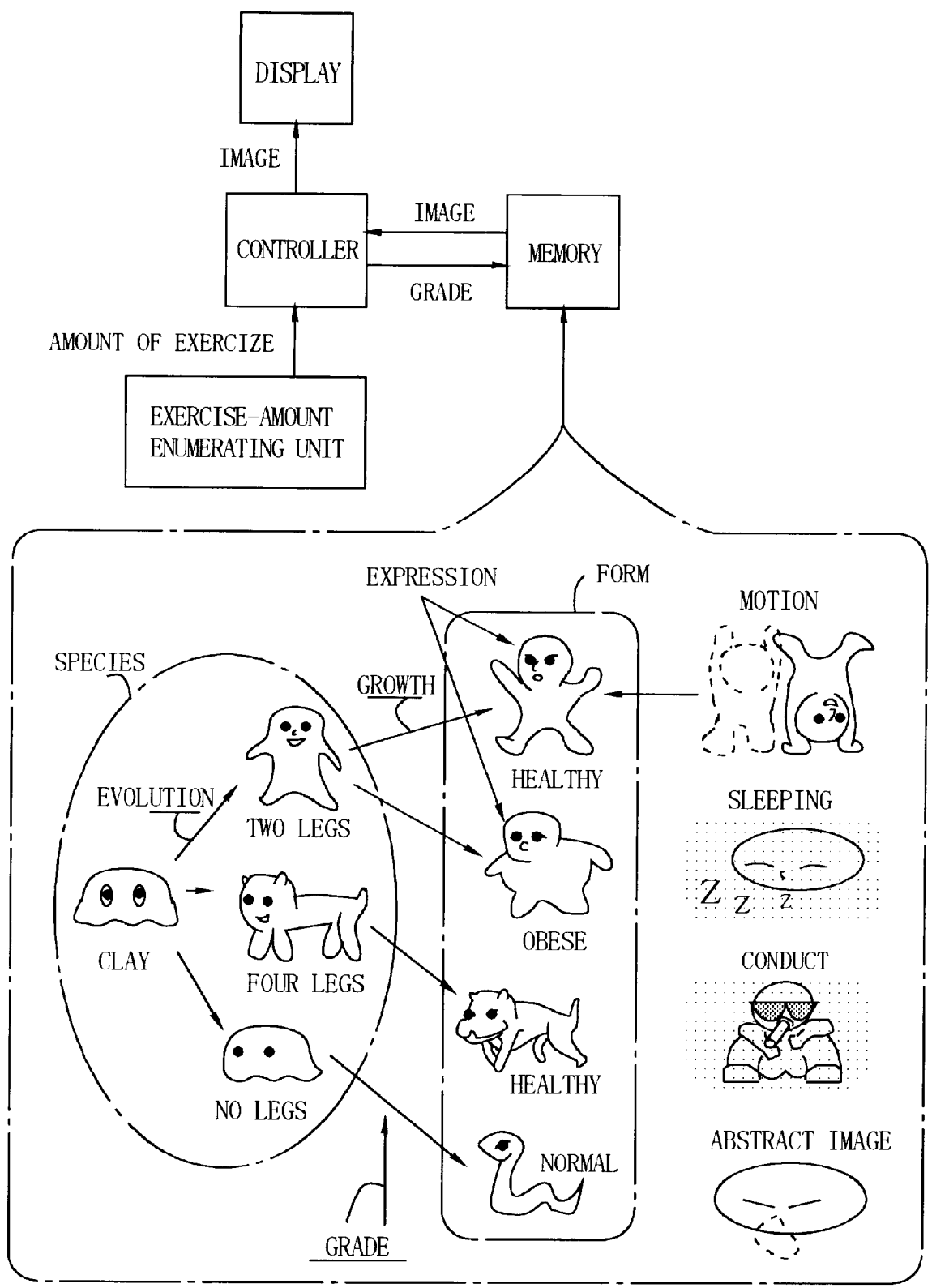
F I G. 1

(a) OSCILLATION SENSOR

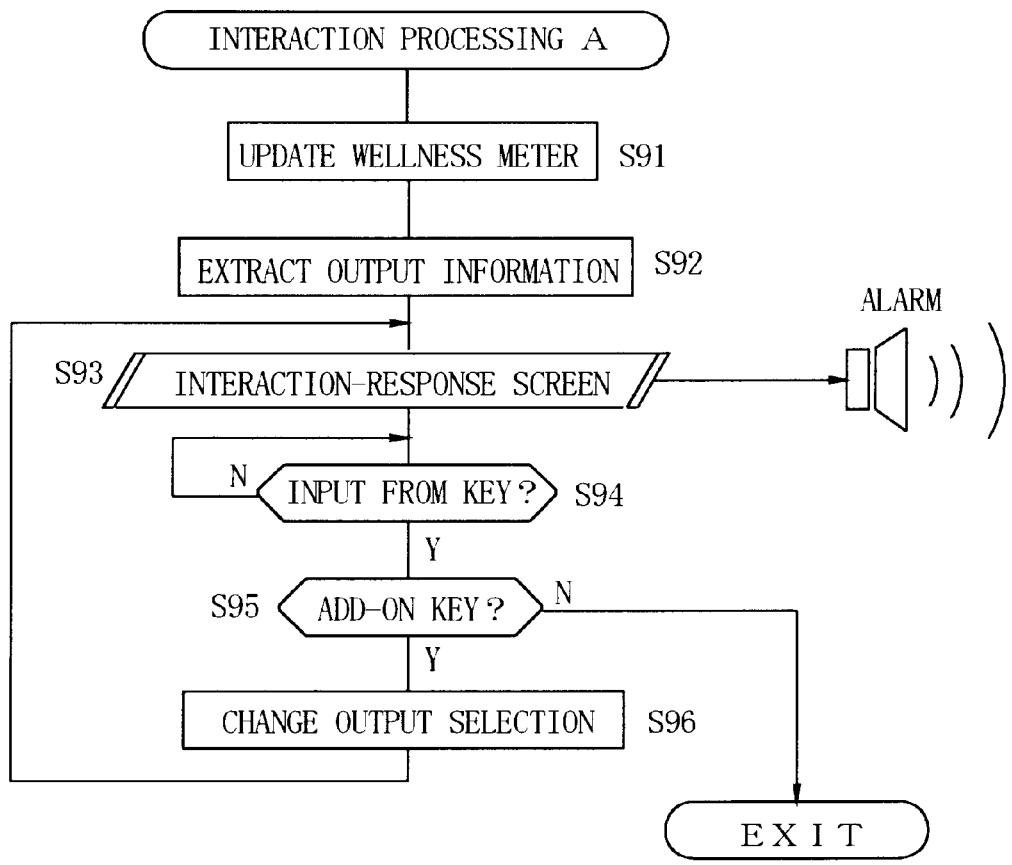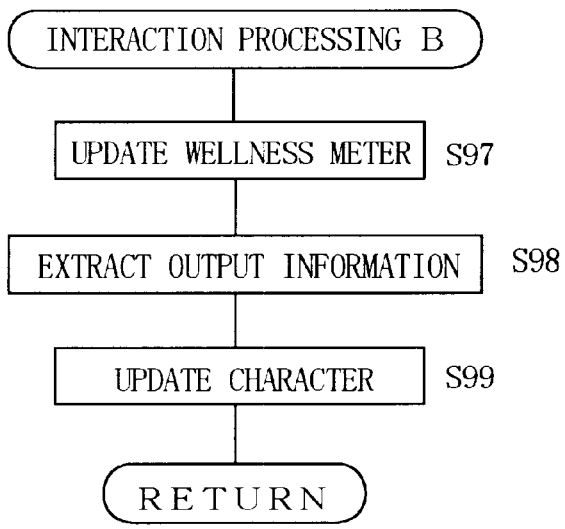
FIG. 12

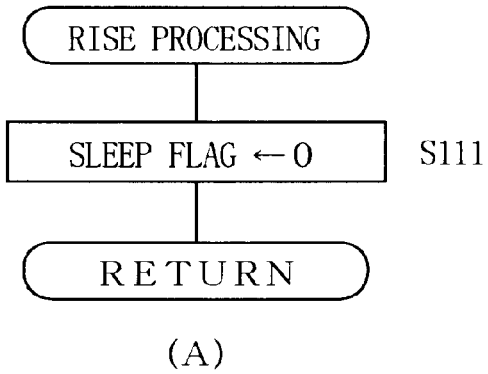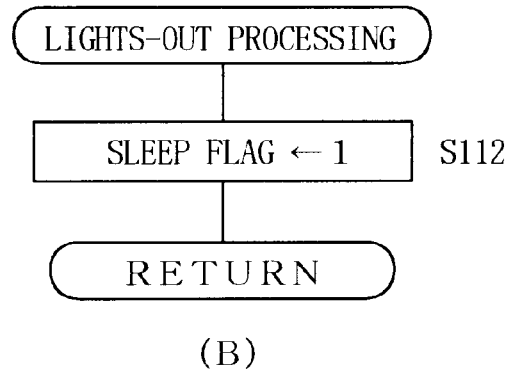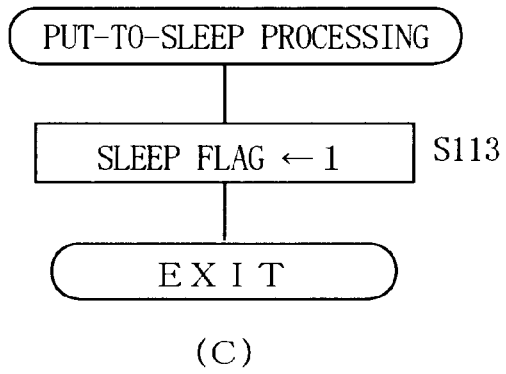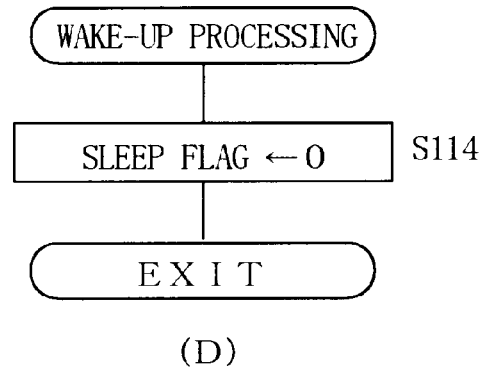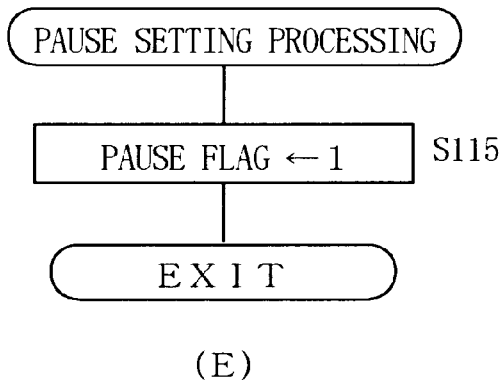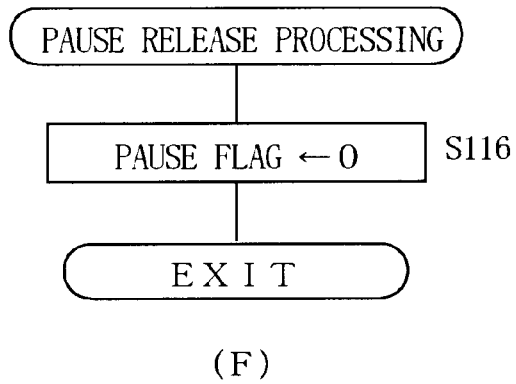
FIG. 14

| LIFE | EVOLUTION |
| --- | --- |
| 8 | TWO LEGS ; INFANT ; NORMAL |
| 7 | FOUR LEGS ; INFANT ; NORMAL |
| 6 | FOUR LEGS ; INFANT ; OBESE |
| 5 | NO LEGS ; INFANT ; NORMAL |
| 4 | NO LEGS ; INFANT ; OBESE |
| 3 | NO LEGS ; INFANT ; ILL |

(A)

| LIFE | GROWTH |
| --- | --- |
| 8 | n LEGS ; HEALTHY |
| 7～6 | n LEGS ; NORMAL |
| 5～4 | n LEGS ; OBESE |
| 3～1 | n LEGS ; ILL |
| 0 | n LEGS ; DECEASED |

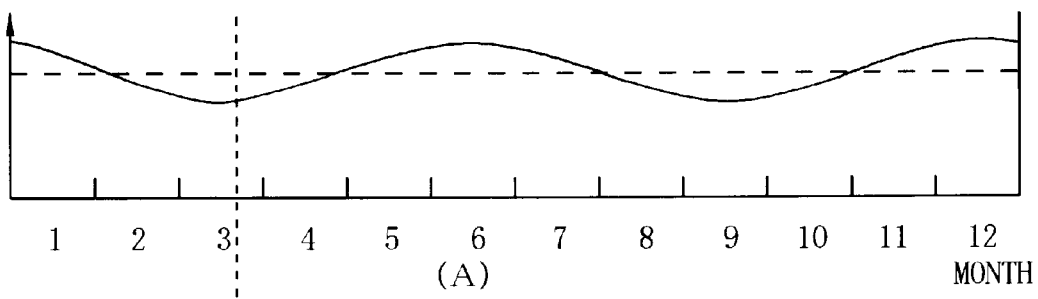
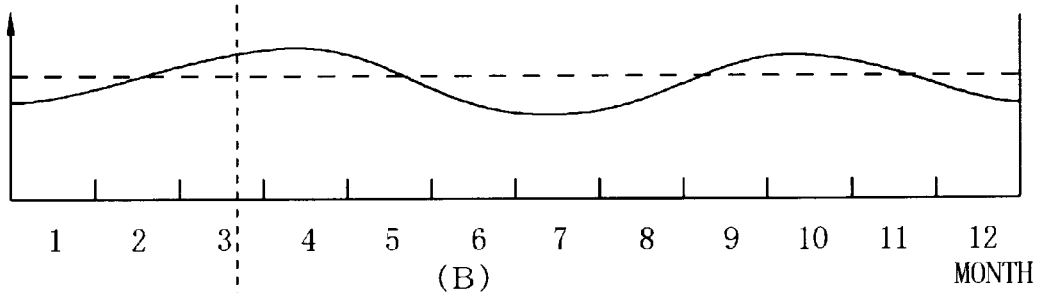
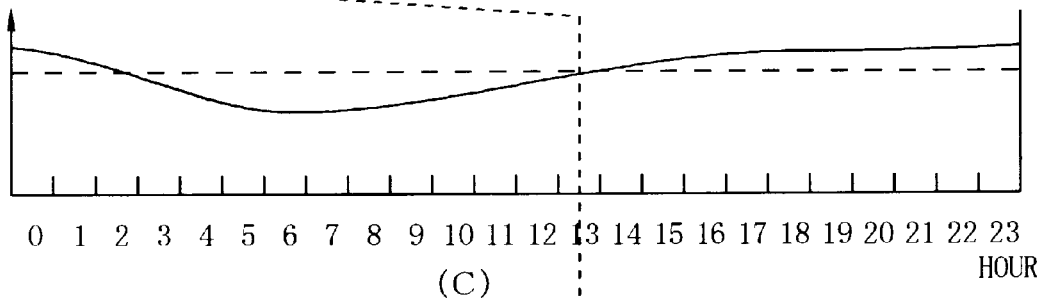
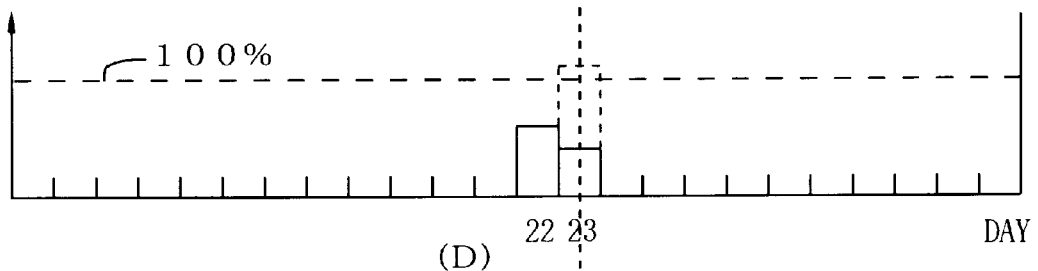
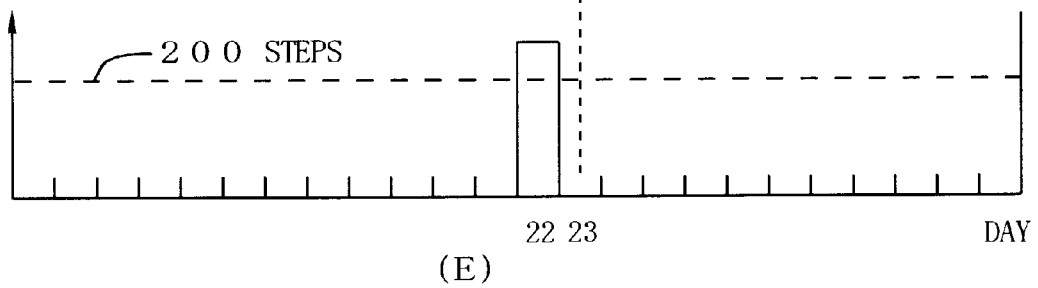
FIG. 16

| CONDITIONS | OUTPUT | EVALUATED ELEMENTS |
|---|---|---|
| 100% OR GREATER | CONGRATULATIONS ON ATTAINING YOUR NORM! ♪ | PRESENT ATTAINMENT RATE |
| 80~99% | YOU'RE ALMOST THERE! SO KEEP TRYING! | PRESENT ATTAINMENT RATE |
| 40% OR LESS | HAVE YOU BEEN LOAFING RECENTLY? | PREVIOUS & PRESENT ATTAINMENT RATE |
| 50% OR LESS | LET'S TRY HARDER! | PREVIOUS & PRESENT ATTAINMENT RATE |
| 8 OR GREATER | GOOD-HUMORED (CHARACTER) ♪ | WELLNESS METER |
| 6~7 | NORMAL (CHARACTER) | WELLNESS METER |
| 4~5 | LAZY (CHARACTER) | WELLNESS METER |
| 3 OR LESS | MELANCHOLY (CHARACTER) | WELLNESS METER |
| — | — | — |
| 200 STEPS OR GREATER | DELINQUENT (CHARACTER) | PREVIOUS & PRESENT-NIGHT WALKING COUNTER |
| n1~n2 | YOU WALKED THE EQUIVALENT OF TWO PIECES OF CAKE | EVALUATION REGISTER |
| n3~n4 | YOUR WALKED FROM NIHOMBASHI TO KYOTO | CUMULATIVE REGISTER |
| MORNING | LET'S PERSEVERE TODAY, TOO! | ACTUAL TIME |
| AFTERNOON | DID YOU EAT LUNCH? | ACTUAL TIME |
| EVENING | DON'T STAY UP TOO LATE | ACTUAL TIME |
| — | — | — |
| SPRING | SPRING LANGUID ALL DAY | ACTUAL DATE |
| SUMMER | SUMMERS ARE REALLY HOT | ACTUAL DATE |
| AUTUMN | AUTUMN MEANS A GOOD APPETITE | ACTUAL DATE |
| WINTER | WINTERS ARE REALLY COLD | ACTUAL DATE |
| DEC. 24~25 | MERRY CHRISTMAS!! ♪ | ACTUAL DATE |
| FEB. 14 | TODAY IS VALENTINE'S DAY! | ACTUAL DATE |
| — | — | — |
| NONE | 03-1234-5678 | NONE |
| NONE | LUN LUN LUN ♪ | NONE |
| — | — | — |

FIG. 17

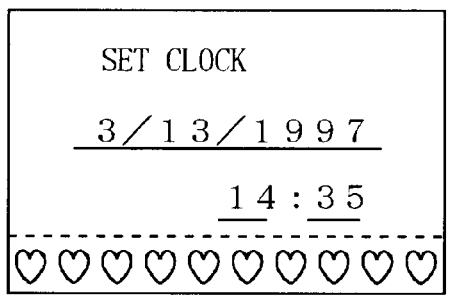
(A) SET CLOCK
(B) SET GOAL
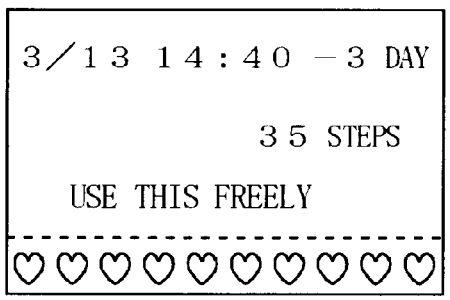
(C) TRIAL
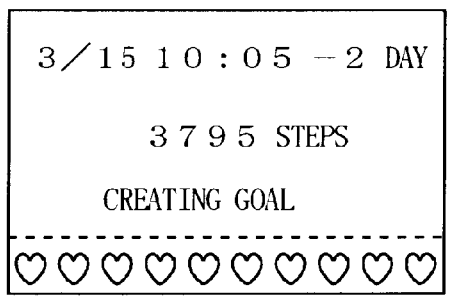
(D) CREATE GOAL
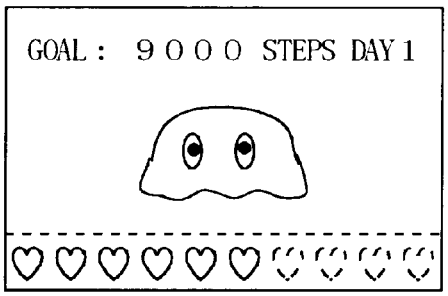
(E) BIRTH
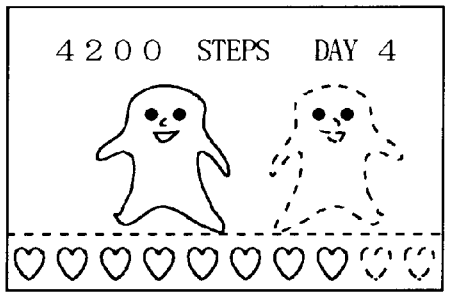
(F) EVOLUTION (INFANT)
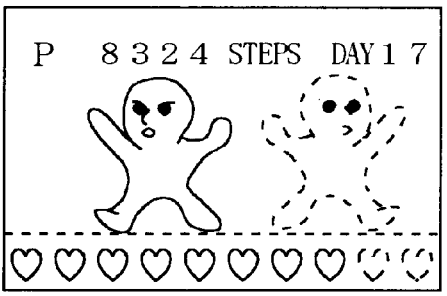
(G) JUVENILE
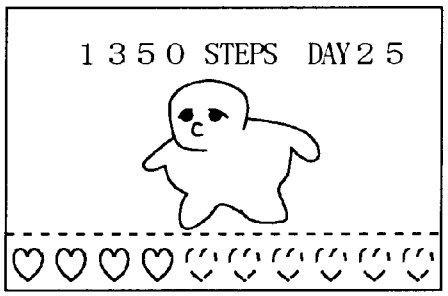
(H) ADOLESCENT
F I G. 1 8

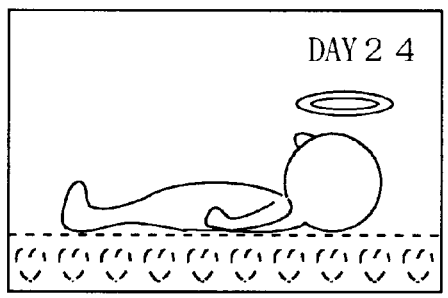
(A) DECEASED
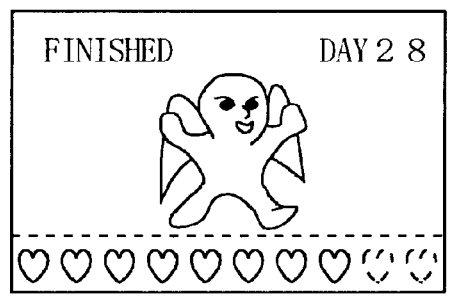
(B) FINAL FORM
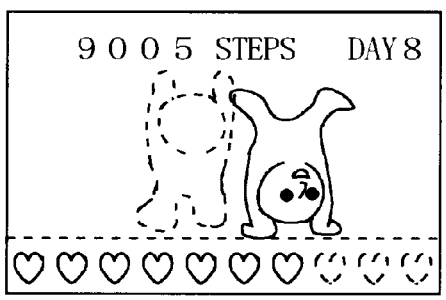
(C) MOOD
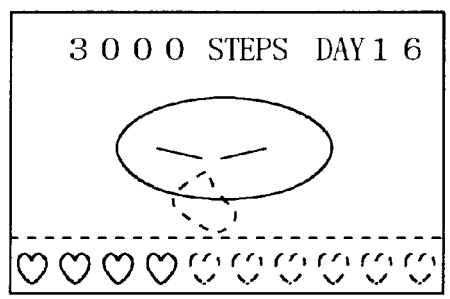
(D) LAZY
(E) DELINQUENT
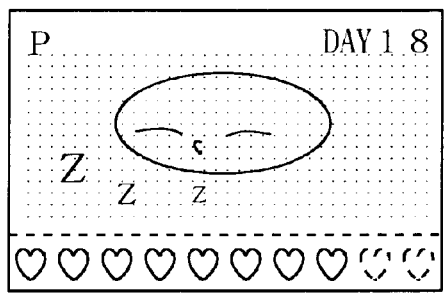
(F) SLEEPING
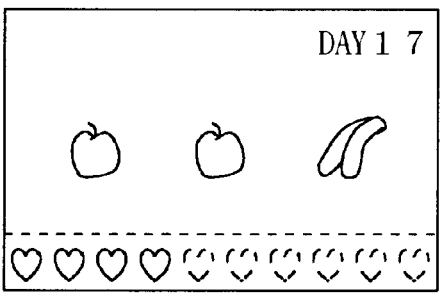
(G) GAME
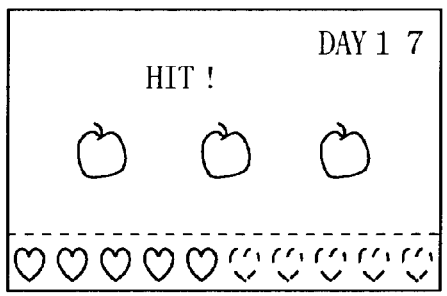
(H) HIT
F I G. 1 9

| CHARACTER | WEIGHT (g) |
|---|---|
| n LEGS ; INITIAL STATE | 20 |
| n LEGS ; INFANT ; HEALTHY | 35 |
| n LEGS ; INFANT ; NORMAL | 30 |
| n LEGS ; INFANT ; OBESE | 40 |
| n LEGS ; INFANT ; VERY OBESE | 50 |
| n LEGS ; INFANT ; ILL | 45 |
| n LEGS ; INFANT ; DECEASED | 43 |
| n LEGS ; JUVENILE ; HEALTHY | 55 |
| n LEGS ; JUVENILE ; NORMAL | 50 |
| n LEGS ; JUVENILE ; OBESE | 60 |
| n LEGS ; JUVENILE ; VERY OBESE | 70 |
| n LEGS ; JUVENILE ; ILL | 60 |
| n LEGS ; JUVENILE ; DECEASED | 58 |
| n LEGS ; ADOLESCENT ; HEALTHY | 70 |
| n LEGS ; ADOLESCENT ; NORMAL | 65 |
| n LEGS ; ADOLESCENT ; OBESE | 80 |
| n LEGS ; ADOLESCENT ; VERY OBESE | 99 |
| n LEGS ; ADOLESCENT ; ILL | 89 |
| n LEGS ; ADOLESCENT ; DECEASED | 88 |
| n LEGS ; ADOLESCENT ; HEALTHY ; ANGEL | 65 |

FIG. 20

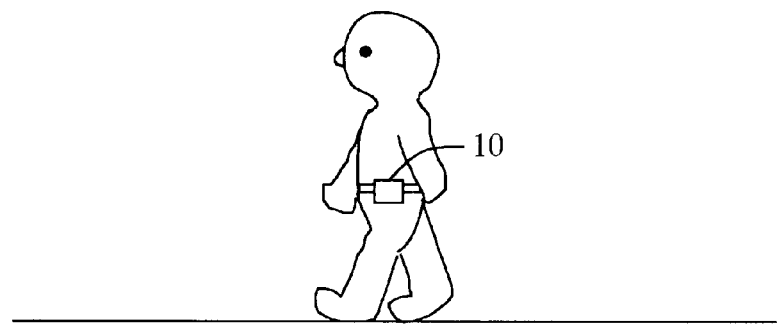
(A)
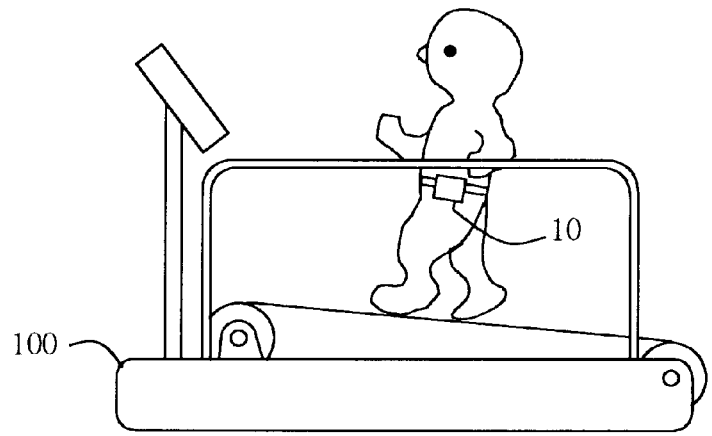
(B)
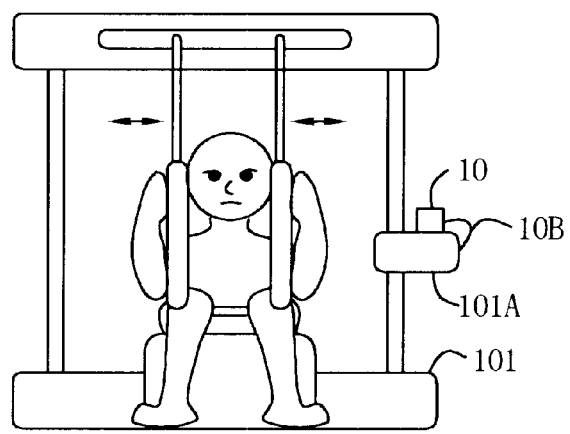
(C)
FIG. 23

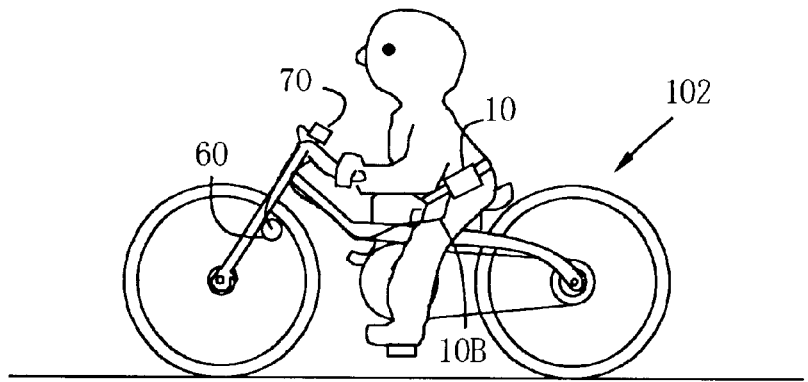
(A)
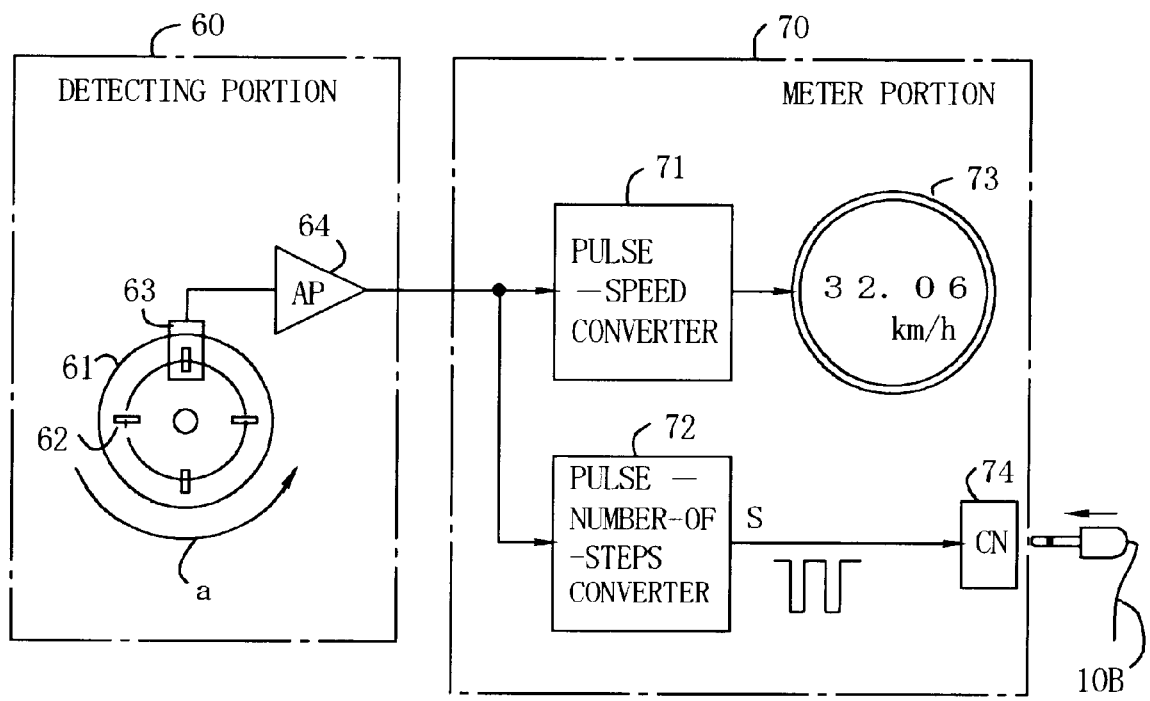
(B)
FIG. 24

EXERCISE SUPPORT INSTRUMENT

TECHNICAL FIELD

This invention relates to an exercise assisting meter and, more particularly, to an exercise assisting meter for enumerating the amount of repetitive physical exercise performed by the user and outputting the enumeration information.

A pedometer is a typical example of an exercise assisting meter of this kind.

BACKGROUND ART

The conventional pedometer is a simple device that places emphasis on functionality and that indicates one's daily number of steps (number of oscillations) by a numerical value or graph or by a value calculated in terms of distance or calories.

If the device does nothing more than inform one of one's daily number of steps, however, it acts merely as a simple measuring instrument with which the user quickly loses interest, especially when exercise is performed over an extended period of time. In addition, merely being informed of one's daily number of steps does not concretely furnish one with a feeling of satisfaction (results) from continuous use over, say, a period of one week. In particular, if a day of rest intervenes during the exercise routine, the feeling of satisfaction after one week is nil.

The cumulative number of steps over several days can be calculated even with a conventional pedometer if the pedometer is not reset daily. However, if the user is informed of a cumulative number of steps extending over several days, the user will no longer be able to tell whether a daily norm (target value) that he or she has decided on has been attained. The only way to ascertain this is to record it separately in a diary, and thus the user is compelled to perform a troublesome management task in addition to the exercise routine.

Further, the conventional pedometer is such that it is employed by a user who decides upon a norm, as mentioned above. However, the number of steps taken during one day differs from person to person, depending upon individual physical stamina or lifestyle, etc. Moreover, a beginner usually does not know how much he or she can walk in one day. If the beginner decides upon the target value of his or her own volition, therefore, the individual tends t decide upon an excessively high value and will not continue with the exercise routine for long. If the beginner attempts to decide upon an appropriate target value, on the other hand, he or she will be constrained to record the daily number of steps before use and to undertake the burden of carefully analyzing the recorded data.

Thus, the conventional pedometer is a simple device that merely indicates a daily number of steps as by a numerical value. Consequently, the device not only does not enable exercise to be performed enjoyably but also fails to appropriately support exercise (health) management over long period of time.

DISCLOSURE OF THE INVENTION

The present invention has been devised in view of the problems of the prior art mentioned above and an object thereof is to provide an exercise assisting meter that makes it possible to exercise enjoyably and to appropriately support exercise (health) management over a long period of time.

The foregoing object is attained by the arrangement shown in FIG. 1. Specifically, an exercise assisting meter according to claim (1) of the present invention comprises an exercise-amount enumeration unit for enumerating amount of repetitive exercise of a user, a memory storing image information on virtual organisms of a plurality of grades, a controller for managing a relative period, which extends from a reference time, and evaluating continuously the amount of exercise enumerated by the exercise-amount enumeration unit every relative period and selecting a virtual organism of a corresponding grade, and a display unit for reading image information on the selected virtual organism out of the memory and displaying this image information on a screen.

The controller manages a relative period, which extends from a reference time, evaluates continuously the amount of exercise enumerated by the exercise-amount enumeration unit every relative period and selects a virtual organism of a corresponding grade. By virtue of this arrangement, it is possible to exercise enjoyably and to appropriately (continuously) support exercise (health) management over a long period of time. Further, the controller evaluates, every relative period, the amount of exercise enumerated by the exercise-amount enumeration unit every relative period. By virtue of this arrangement, the user basically is not informed of progress on the way from the previous evaluation to the current evaluation, as a result of which the user looks forward to the current evaluation with greater anticipation. Further, the controller continuously evaluates the amount of exercise enumerated by the exercise-amount enumeration unit every relative period. By virtue of this arrangement, it is possible to reflect the results of one, two or more past evaluations, which are made every relative period, in the results of the current evaluation. This makes it possible to provide unexpected results of evaluation in response to continuous effort by the user.

The amount of repetitive exercise of the user mentioned above means the number of times repetitive exercise, such as walking, weightlifting, expander exercises and abdominal-muscle exercises, is performed by the user. The exercise-amount enumeration unit, therefore, consists essentially of a counter, for example, and does not signify inclusion of an exercise measuring device (an oscillation sensor, etc.) that converts exercising (such as walking) per se to a repetitive signal. The aforesaid virtual organisms mean actual and imaginary organisms (animals, fish, insects, plants, dinosaurs, aliens, etc.). The grades signify ranks inclusive of a superior/inferior concept, or simple grade divisions. In the case of the former (the superior/inferior concept), image information representing virtual organisms expressing the concept of superiority (high level, healthy, happy, etc.) and the concept of inferiority (low level, obese, dejected) is provided to correspond to large and small amounts of exercise, respectively. In the case of the latter (simple grade divisions), any image information representing virtual organisms subjected to simple grade division irrespective of ranking is provided to correspond to large and small amounts of exercise. The latter case offers the enjoyment and surprise of not being able to guess which virtual organism will appear.

Preferably, in claim (2) of the present invention, the memory in claim (1) of the present invention stores image information of a plurality of grades relating to species, forms, expressions and/or motion of virtual organisms.

For example, two-legged, four-legged and legless types of organisms are stored. Furthermore, forms of human health, obesity and illness, for example, are stored. Also stored, for example, are human smiling faces and ordinary or dejected (melancholic) expressions. Furthermore, human wellness and motion (action) representing ordinariness or depression, for example, are stored. In accordance with (2) of the present invention, therefore, the results of evaluating amount of exercise can be expressed very richly to include not only species but also the form, expression and action of the species.

Preferably, the controller of the present invention causes the species of a virtual organism to evolve or causes the form of the virtual organism to grow with a continuous evaluation.

The reference time refers to a reference day at which an exercise starts, for example, and the relative period which starts from the reference time refers to a first period (first day) and a second period (second day) counting from the reference time (reference day). In accordance with claim (3) of the present invention, exercise over a long period of time can be enjoyed in conjunction with evolution or growth of a virtual organism, not simply by counting the number of days.

Preferably, in claim (4) of the present invention, the controller in claim (1) of the present invention retains a target value of an amount of exercise to be attained within one relative period and, by judging whether or not a goal has been attained, evaluates the amount of exercise enumerated by the exercise-amount enumeration unit in regard to each relative period.

One relative period refers to, e.g., one day. The target value is set manually or automatically. In accordance with claim (4) of the present invention, rather than mentioning in detail a daily goal attainment rate, the arrangement is such that the results of exercise are judged based upon whether or not the target value has been attained, especially in regard to exercise over the long term. This is not only easy for the user to remember but also encourages the user to exercise while adopting simple goal attainment as a daily goal. Whether or not the goal has been attained is determined not by subjective judgment in one's own mind, as in the prior art, but objectively and rigidly by judgment rendered by a machine (third-party evaluation). Accordingly, when a goal is attained, the user is provided with a greater feeling of satisfaction. When a goal fails to be attained, enlightenment is provided for the next time and the user is prompted to continue training.

Preferably, in claim (5) of the present invention, the controller in claim (4) of the present invention enumerates a cumulative value of amount of exercise performed over a predetermined period of time and obtains target value based upon a calculation (cumulative value)×[(one relative period)/(predetermined time period)].

In claim (5) of the present invention, the present assisting meter sets a target value automatically taking into consideration the fact that it is difficult for a beginner to decide his or her own target value (norm). This can be carried out with ease if the user decides an appropriate time every day and exercises (walks, etc.) at such time; the user need not decide a daily target value.

If the aforesaid one relative period is made, e.g., one day, and the predetermined period of time is made, e.g., three days, these are already known by the user. The result of the user walking a total of three hours (12,000 steps) the first day, two hours (8,000 steps) the second day and three hours (12,000 steps) the third day, for example, will be a cumulative value that is equal to 32,000 steps. We then have target value=32,000×(⅓)=10,666 steps. Rounding down fractions gives 10,000 steps.

Thus, if the user merely exercises to the extent possible, a target value that is not excessive for the user is set appropriately. It is possible to set a higher norm if the user tries harder or to set a lower norm if the user cuts back. In either case, the user is capable of directly experiencing how difficult or how easy the current exercise is and can adjust the exercise correctly based thereon. It should be noted that the predetermined period of time (three days) may be shorter than the predetermined period (one day), e.g., a half-day. In this case, we have target value=(half-day's accumulative value)×(1/0.5) and a target value is obtained in a short time.

Preferably, in claim (6) of the present invention, the controller in claim (4) of the present invention manages a life gauge that is for controlling selection of a species or form of a virtual organism and causes the life gauge the next time to be incremented or decremented in accordance with the judgment, made in each relative period, as to whether or not a goal has been attained.

In accordance with claim (6) of the present invention, the life gauge currently reflects past achievement and dynamically expresses exercising history. Since selection of the species or form of a virtual organism is controlled in accordance with the life gauge, the virtual organism (character) on the display screen develops two legs (evolves into a human being) or changes to or grows to a healthy form (physique) if the user strives daily. If the user is idle from day to day, the virtual organism evolves into a legless animal or changes to or grows into a form (physique) of obesity or illness. If the user strives or grows lazy, the species or form changes within the bounds of possibility. Accordingly, the progress of long-term exercise can be represented with rich expression and in dynamic fashion by evolution and growth of the character and a change in the physique of the character. In this case growth of the character serves as a good measure indicating elapsed exercise time.

Preferably, in claim (7) of the present invention, the controller in claim (1) of the present invention retains one, two or more goal attainment rates that extend back in time from the present, causes the target value the next time to increase in a case where one, two or more goal attainment rates exceed a first predetermined threshold value that is greater than 1, and causes the target value the next time to decrease in a case where one, two or more goal attainment rates fall below a second predetermined threshold value that is less than 1.

In general, it is preferred that a norm not be changed once it has been set. However, if a severe norm has been set, the character that appears on the screen will weaken in an instant even though the user is persevering. Conversely, if a lax norm has been set, the character will become healthy in an instant even though the user is not persevering. In either case, a discrepanc can develop relative to the subjectivity of the user and this can cause the user to fail to persist. In claim (7) of the present invention, therefore, goal attainment rates extending over two consecutive days, for example, are evaluated and a target value can be varied in dependence upon the degree of perseverance. As a result, not only is any discrepancy relative to the user's subjectivity eliminated but it is also possible for the user to properly enjoy an initiated exercise to its conclusion without over-or under-exertion. In addition, the meter makes it possible to properly support exercise (health) management over the long term.

Preferably, in claim (8) of the present invention, the controller in claim (3) of the present invention retains one, two or more goal attainment rates that extend back in time from the present and causes the species of the virtual organism the next time to mutate to a species of a superior grade in a case where one, two or more goal attainment rates exceed a third predetermined threshold value that is greater than 1.

In accordance with claim (8) of the present invention, it is possible for the character on the screen to mutate if the user demonstrates determination during the course of exercising. As a result, an individual who temporarily grew idle is given the opportunity for recovery, in which the character evolves to a higher species. Further, using a logical and rich method of expression, the present meter makes it possible to dynamically follow up large changes in amount of exercise during the course of exercise performed by the user.

Preferably, in claim (9) of the present invention, the memory in claim (1) of the present invention stores image information indicating that a virtual organism is resting, and the controller manages actual time and, from a first predetermined time of the previous night to a second predetermined time of the following morning, causes the image information indicative of resting to be displayed instead of image information indicating that the virtual organism is awake.

In accordance with claim (9) of the present invention, a character on the screen wakes up in the morning and sleeps at night in the same fashion as the user. The character therefore shares its life with the user and the user develops a feeling of intimacy with the character just as if the user were exercising together with the character for a long period of time.

Preferably, in claim (10) of the present invention, the memory in claim (1) of the present invention stores image information indicating the conduct(behavior) of a virtual organism, and the controller manages actual time and, in a case where amount of exercise greater than a predetermined amount is detected within a predetermined period of time at night, the controller causes the image information indicative of conduct to be displayed by inserting the information or superimposing it at an appropriate timing.

In accordance with claim (10) of the present invention, the controller produces a suit image indicating conduct (signifying a warning) in response to detection of the fact that the user is pleasure-seeking at night. As a result, the user is encouraged to proceed with long-term exercise in a healthy manner.

Preferably, in claim (11) of the present invention, the controller in claim (6) of the present invention retains date of birth of the user, information representing a comfort index that conforms to the season and/or a mood index that conforms to the time, and manages actual time, actual date and a wellness meter for controlling selection of expression or motion of a virtual organism being displayed on the screen. The wellness meter is obtained at a suitable timing by a weighted evaluation of a combination of any one, two or more of an evaluation regarding goal attainment rate at the present time and/or on a day in the past, a biorhythm at the present date obtained from the date of birth, the comfort index conforming to the actual date, the mood index conforming to the actual time, and a random number.

In accordance with claim (11) of the present invention, a character on the screen not only evolves, grows and changes in physique in dependence upon the life gauge but also undergoes a change in expression or motion (action) at a suitable timing in accordance with the wellness meter indicating the wellness of the character.

The wellness meter is decided placing emphasis mainly upon evaluation of short-term goal attainment rate and is not directly related to the life gauge, which decides the physique of the character. Even if physique (the life gauge) is making a transition to health, therefore, the character will be out of spirits from the morning of the present day if the character was neglectful the previous day. Conversely, even if physique (the life gauge) is undergoing a transition to obesity or illness, the character will be in good spirits tonight if the character persevered during the day.

Furthermore, if the wellness meter takes into account the biorhythm of the user, the comfort index conforming to season and the mood index conforming to time (morning, evening), then the expression and attitude of the character will approach the feeling of the user. The character in this case seems to be sharing its life with user under the same circumstances (origins) and in the same environment as that of the user.

Furthermore, if the wellness meter takes into account some random numbers, the mood (expression, deportment) of the character will exhibit some capriciousness. The character in this case appears as the user itself or as someone else.

It should be noted that control of the selection of the expression presented by a virtual organism on the screen may involve changing only the expression of one part of the form (character) being displayed on the screen or selecting the entirety of the form (character) of a different expression. Thus, in accordance with claim (11) of the present invention, the user is capable of continuing exercising enjoyably over a long period of time together with a character of rich expression and conduct.

Preferably, in claim (12) of the present invention, claim (6) of the present invention is provided with an interaction key for interaction with a virtual organism, and the memory stores a plurality of items of image information abstractly represent good and bad moods of a virtual organism. The controller retains date of birth of the user, a comfort index that conforms to the season and/or a mood index that conforms to the time, and manages actual time, actual date and a wellness meter for controlling selection of an interaction response screen. The wellness meter is obtained at the time of an input from the interaction key by a weighted evaluation of a combination of any one, two or more of an evaluation regarding goal attainment rate at the present time and/or on a day in the past, a biorhythm at the present date obtained from the date of birth, the comfort index conforming to the actual date, the mood index conforming to the actual time, and a random number. Image information abstractly representing said moods corresponding to the wellness meter is displayed on the interaction response screen.

In accordance with claim (12) of the present invention, a character on the screen does not merely evolve, grow and change in physique in dependence upon the life gauge. When the interaction key for interacting with a character is pressed, there is a display of image information abstractly indicating good or bad moods, etc., of the character at such time in accordance with the wellness meter indicating the wellness of the character.

The abstract image is an image not related to the species or form of the character and comprises, say, an abstract facial expression. Various wellness states of the character (good spirits, happiness, anger, fear, motivation, sadness, laziness, fatigue, melancholy, illness, etc.) can be expressed abstractly and in easily understandable fashion even on a screen of limited size. Of course, the state of wellness of the character may be expressed by an image of an abstract action (as by a simple animation method).

Preferably, in claim (13) of the present invention, claim (6) of the present invention is provided with an interaction key for interaction between the user and a virtual organism, and the memory stores a message conversion table in which season, date and time, and/or evaluation of goal attainment rate at the present time and/or on a day in the past serve as conditions and in which message information regarding greetings, words of encouragement and/or praise, etc., are made to correspond to respective ones of these conditions. The controller manages the actual time and actual date and, in response to an input from the interaction key, extracts, and displays on the interaction response screen, message information from the message conversion table, the message information conforming to the present date, present time and/or evaluation of goal attainment rate at the present time and/or on a day in the past.

In accordance with claim (13) of the present invention, a character on the screen does not merely evolve, grow and change in physique in dependence upon the life gauge. When the interaction key for interacting with a character is pressed, various message information is output to the screen (and to a speaker if necessary) based upon evaluation of goal attainment rate at such time, actual time (morning, afternoon, evening, etc.), season and actual date (calendar information). The message information relates to greetings, words of encouragement and praise conforming to conditions. Accordingly, though only one-way, the user can enjoy dialog with a character. In addition, unexpected events such as a greeting to the effect that today is Valentine's Day can be communicated to the user.

Preferably, in claim (14) of the present invention, claim (1) of the present invention is provided with a prescribed key and the controller is adapted so as to be capable of activating or deactivating the enumerating operation of the exercise-amount enumeration unit in response to an input from the prescribed key.

For example, an inconvenience can arise in that if the user boards a train or bus, etc., while the present meter is being used as a pedometer, the gauge will detect rocking of the train or bus and enumerate this rocking as amount of exercise despite the fact that the user is not walking. In claim (14) of the present invention, the enumerating operation of the exercise-amount enumeration unit can be activated or deactivated by simple operation of a key.

Preferably, in claim (15) of the present invention, the exercise-amount enumeration unit in claim (1) of the present invention detects time intervals at which a signal relating to the amount of repetitive exercise of the user is generated, evaluates these time intervals by a predetermined threshold value and separately counts signals, which belong to different time intervals, as amounts of exercise of different categories.

For example, if the user walks and runs while the present meter is being used as a pedometer, the amount of exercise cannot be evaluated correctly unless these activities can be distinguished from each other. In claim (15) of the present invention, the time intervals of exercise produced in such continuous fashion are detected, the time intervals are evaluated in terms of magnitude relative to the predetermined threshold value and signals belonging to different time intervals are counted separately as amounts of exercise of different categories (e.g., walking or running). It is possible, therefore, to correctly evaluate the amount of exercise of the user.

Preferably, in claim (16) of the present invention, the controller in claim (6), (11) or (12) is provided with a prescribed game processing function and causes the life gauge or wellness meter to be incremented if the user has won a game.

In order to increment the life gauge or wellness meter, basically the only way is to attain the daily goal. However, adhering to this too strictly results in long-term exercising becoming to severe and provides no leeway. Accordingly, if the user plays a game in the meantime and wins the game, the life gauge or wellness meter (and the goal attainment rate if necessary) is incremented as a reward. When the user is constrained to take a day off from exercising, therefore, the user plays the game.

Preferably, in claim (17) of the present invention, claim (6) of the present invention is provided with a prescribed key and the controller provides a plurality of personal files for managing the relative period, target value and life gauge of the user and changes over a personal file that is the object of management in accordance with an input obtained by operating the prescribed key.

If a plurality of personal files are provided, the exercise routines of a plurality of individuals (e.g., A and B) can be managed concurrently by a single inexpensive meter and A and B can enjoy competing. For example, today A uses the present instrument upon changing over the personal file to A, whereupon A's personal file is updated. In the meantime, the personal file of B remains quiescent and B practices in preparation for tomorrow. On the next day, B uses the present instrument upon changing over the personal file to B, whereupon B's personal file is updated. In the meantime, the personal file of A remains quiescent and A practices in preparation for tomorrow.

Alternatively, A, who can exercise only three days a week, uses the present instrument upon changing over the personal file to A only on those days on which exercising can be performed, with B's personal file being treated as a dummy file without being used. If this expedient is adopted, A's personal file is updated just as if A's exercising, performed discontinuously three days a week, where performed on three consecutive days.

Preferably, in claim (18) of the present invention, claim (1) of the present invention is provided with signal input means coupled to an external exercise measuring device by wire, light or radio, for inputting a signal indicative of detection of repetitive amount of exercise of a user measured by the external exercise measuring unit.

In a case where the present meter is used as a pedometer, it is preferred that a simple oscillation sensor be incorporated within the meter. However, exercising performed by the user is not only walking. For example, repetitive exercises (strengthening of pectoral muscles, etc.) of a variety of forms may be carried out using a variety machines at an athletics center, for example. Many machines, if their motion is repetitive, no matter how complicated, can convert this motion to repetitive pulse signals in a manner similar to that of an oscillation sensor and provide the signals externally in simple fashion.

Accordingly, in claim (18) of the present invention, a signal indicative of detection of repetitive amount of exercise of a user measured by the external exercise measuring unit (machine) is input by the signal input means and this signal is processed is a manner similar to that from a pedometer, by way of example. Though one step in walking and one repetition of an exercise for strengthening pectoral muscles cannot be compared in terms of amount of exercise, all of the exercising performed by the user in one day can at least be the object of evaluation. Of course, it should be obvious that the present meter may be used from the start exclusively for the purpose of managing exercise for the strengthening of the pectorals. Further, if the machine outputs the pectoral strengthening exercise as a pulse signal calculated in terms of a corresponding number of steps, the total amount of exercise can be evaluated correctly combining both walking and pectoral strengthening exercises.

BRIEF DESCRIPTION OF THE DRAWINGS

FIG. 1 is a diagram for describing the principles of the present invention;

FIG. 12 is a flowchart (1) of character interaction processing according to this embodiment;

FIG. 14 is a flowchart of other control processing according to this embodiment;

FIG. 15 is a diagram for describing a life conversion table according to this embodiment;

FIG. 16 is a diagram for describing a wellness meter according to this embodiment;

FIG. 17 is a diagram for describing an interaction-output extraction table according to this embodiment;

FIG. 18 is a diagram (1) for describing a display screen according to this embodiment;

FIG. 19 is a diagram (2) for describing a display screen according to this embodiment;

FIG. 20 is a diagram illustrating a weight conversion table for characters according to this embodiment;

FIG. 23 is a diagram (1) for describing forms of using the exercise assisting meter according to this embodiment; and FIG. 24 is a diagram (2) for describing forms of using the exercise assisting meter according to this embodiment.

BEST MODE FOR CARRYING OUT THE INVENTION

Figure 2:
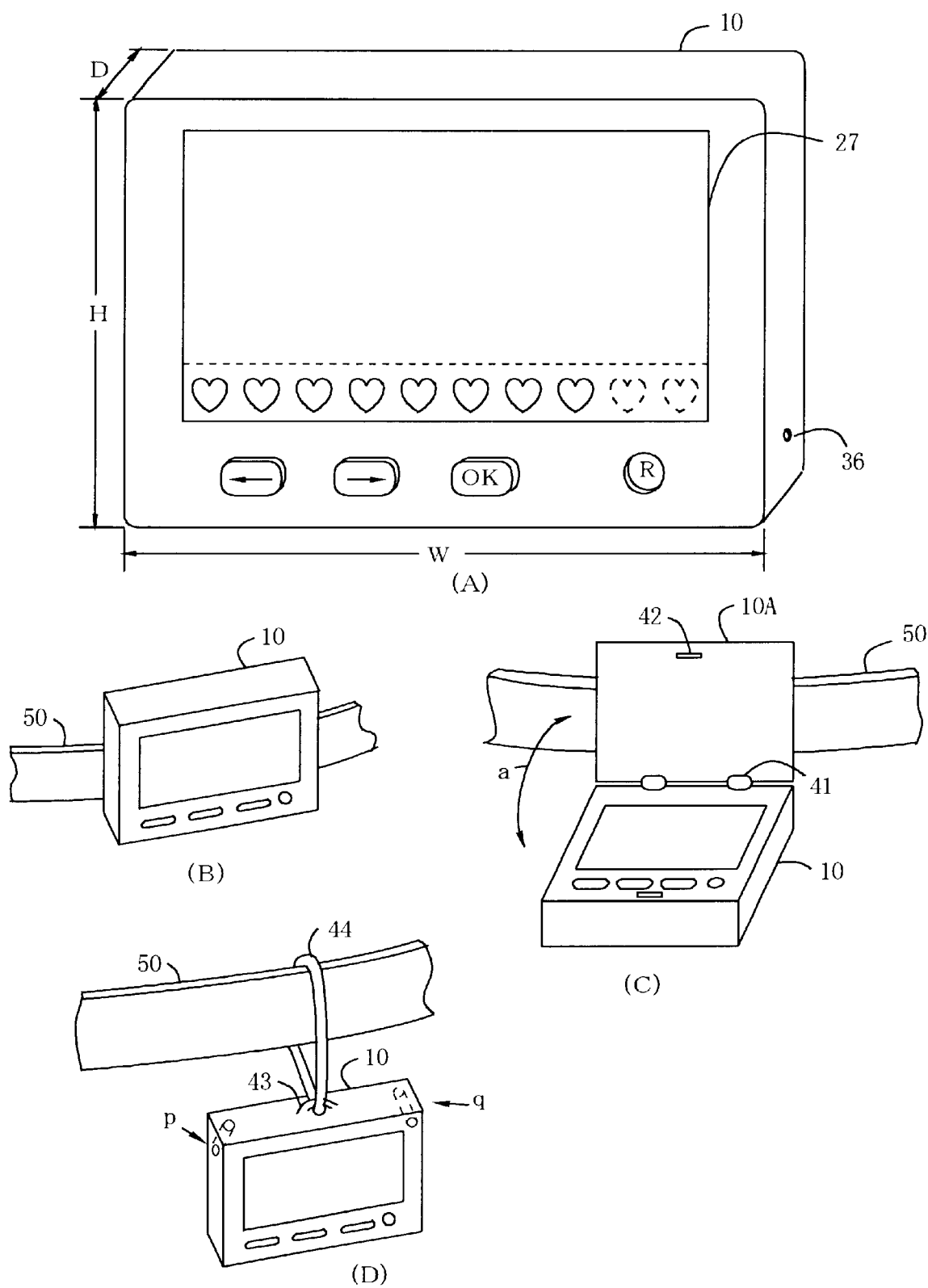
FIG. 2 is an external view of an exercise assisting meter (training pedometer) according to an embodiment.

The best mode for carrying out the present invention will be described in detail with reference to the accompanying drawings. It should be noted that identical reference characters indicate identical or corresponding components throughout the drawings.

FIG. 2 is an external view of an exercise assisting meter (training pedometer) according to an embodiment.

In FIG. 2(A), the dimensions of one example of a main body 10 are a width W of 50 mm, a height H of 30 mm and a depth D of 10 mm. The front has a console (liquid crystal display 27, key switches), the side a connector jack 36, described later, and the back a fastener (not shown) for being fastened to a belt or the like. The external shape of the main body 10 is not limited to the rectangular configuration shown. The main body can be constructed to have a variety of shapes, such as one having a rounded configuration, to the extent that functionality and operability are not sacrificed.

FIG. 2(B) illustrates an instrument 10 of a standard type. When used, the instrument can be carried about by hooking the back fastener on a belt 50 (or by winding it about the belt).

FIG. 2(C) illustrates an instrument 10 of another type. Here the structure is such that a fastening adapter (cover) 10A is attached to the front of the main body 10 by a hinge member 41 or the like so as to be free to open and close. At the time of use, a fastener (not shown) on the back of the adapter 10A is hooked on the belt 50 so that the instrument can be carried about. Ordinarily, the main body 10 is used (operated) by latching it with the adapter 10A by a latch member 42 (latch mechanism or magnet, etc.) The main body 10 is opened when the console is viewed or manipulated.

FIG. 2(D) illustrates an instrument 10 of another type. Here the structure (of key-holder type) is such that the main body 10 is provided with a handle member 43 substantially at the center of its top side so that the instrument is used while being suspended from the belt 50 by a ring-shaped strap (or chain) that is passed through the handle member 43.

It should be noted that the main body 10 may be directly provided with a hole, which is indicated by arrow p or q, instead of the handle member 43.

Figure 3:
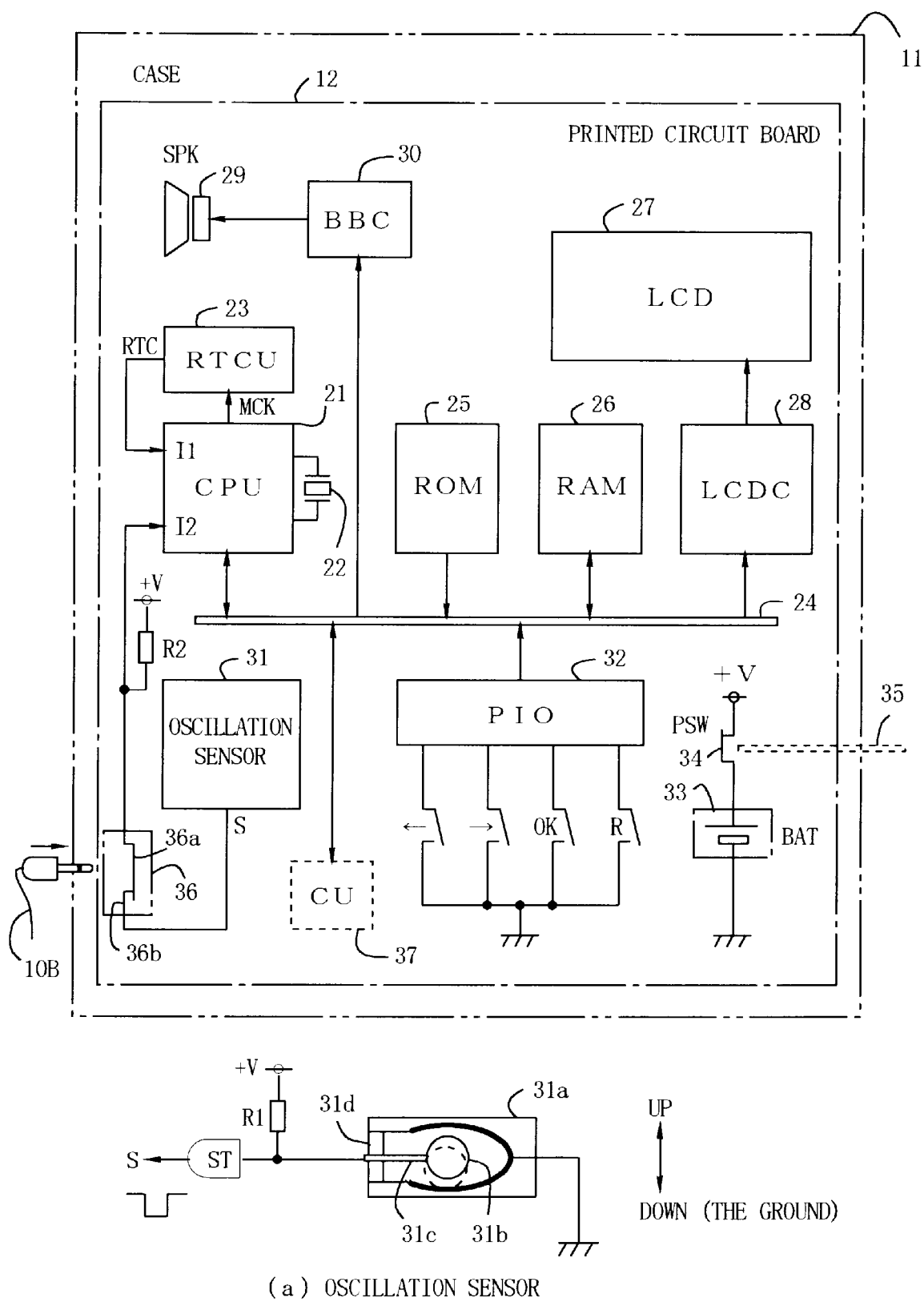
FIG. 3 is a diagram showing the structure of the exercise assisting meter according to this embodiment.

FIG. 3 is a diagram showing the structure of the exercise assisting meter according to this embodiment.

Shown in the Figure are a case (main body) 11 of the instrument, a printed circuit board 12, a CPU 21 for overall control of the instrument 10, a quartz oscillator 22, a real-time clock unit (RTCU) 23, a common bus 24 of the CPU 21, a ROM 25, a RAM 26, a liquid crystal display (LCD) 27, an LCD controller (LCDC) 28, a speaker (SPK) 29 using a piezoelectric vibrating plate, a baseband processor (BBC) 30 for converting audio data to an audio signal (sound), an oscillation sensor 31 for sensing oscillation (walking, etc.), a peripheral I/O (PIO) 32 of the CPU 21, a left key "←", a right key "→", an enter (select) key "OK", a reset key "R", a button battery (BAT) 33 of 3 V, for example, a power switch (PSW) 34, an external rod member (e.g., a match stick) 35 used when the power supply of the instrument is turned off temporarily, a connector jack 36, and a communication unit (CU) 37.

The CPU 21 has a function for accepting external interrupts I1, I2 from the RTCU 23 and oscillation sensor 31 and an internal interrupt based upon internal operation (a timer function, etc.) of the CPU 21. The ROM 25 stores a common data file 25a (e.g., various character patterns shown in FIG. 5 and various data tables shown in FIGS. 15–17 and FIG. 20) illustrated in FIG. 4(C), control programs shown in FIGS. 6–14 and various screen implementation information shown in FIGS. 18, 19. The RAM 26 stores a common data file 26a shown in FIG. 4(A), personal data files 26b, 26c shown in FIG. 4(B), and other variable data information.

The RTCU frequency-divides a master clock signal MCK of the CPU 21 to thereby generate a real-time clock interrupt RTC at a rate of once every 10 ms, by way of example. The CPU 21 manages real-time (actual-time) information in the RAM 26 based upon this clock interrupt. It should be noted that a CPU having a built-in real-time clock function may be used.

The inserted diagram (a) illustrates the structure of the oscillation sensor 31.

Shown in the Figure are a hollow case 31a, a spherical gravity contact 31b consisting of metal, a support member 31c of the gravity contact and an insulating stationary member 31d for fixedly holding the support member 31c on the case 31a. The case 31a is metallic or has a metal coating surface provided on at least the inner surface of a cavity, and the metal surface is grounded to the grounding point of the printed circuit board 12 to form a ground contact. The support member 31c comprises a rod-shaped, plate-shaped or coil-shaped spring member and has an appropriate elastic coefficient and damper coefficient for flexibly supporting the prescribed gravity contact 31b. As a result, the gravity contact 31b will not contact the ground contact 31a if oscillation (acceleration) is less than half cycle, for example, and will not follow up oscillation (acceleration) of greater than five cycles, for example. A contact signal from the gravity contact 31b enters a Schmitt trigger circuit ST via a pull-up resistor R1 to thereby raise resistance to noise. An output signal S from this circuit is input to the external interrupt interface channel I2 of the CPU 21 via the connector jack 36.

The connector jack 36 has a spring contact 36a and a stationary contact 36b and normally connects the output signal S of the oscillation sensor 31 to the CPU 21. If a contact pin of a cable 10B is inserted from the outside, however, the spring contact 36a is pressed by the tip of the pin to break the contact between the oscillation sensor 31 and the CPU 21 and input the signal from the cable 10B to the CPU 21. The spring contact 36a is biased to +V by a pull-up resistor R2. A driver circuit (ST, etc.) of output-open collector type can be connected to the contact 36a. A case in which the cable 10B is used will be described with reference to FIGS. 23 and 24.

It should be noted that the oscillation sensor 31 may be constructed utilizing a piezoelectric element. An oscillation sensor available on the market can be utilized. Further, the communication unit 37 is not always necessary. A method of using this unit also will be described with reference to FIG. 23.

Figure 4:
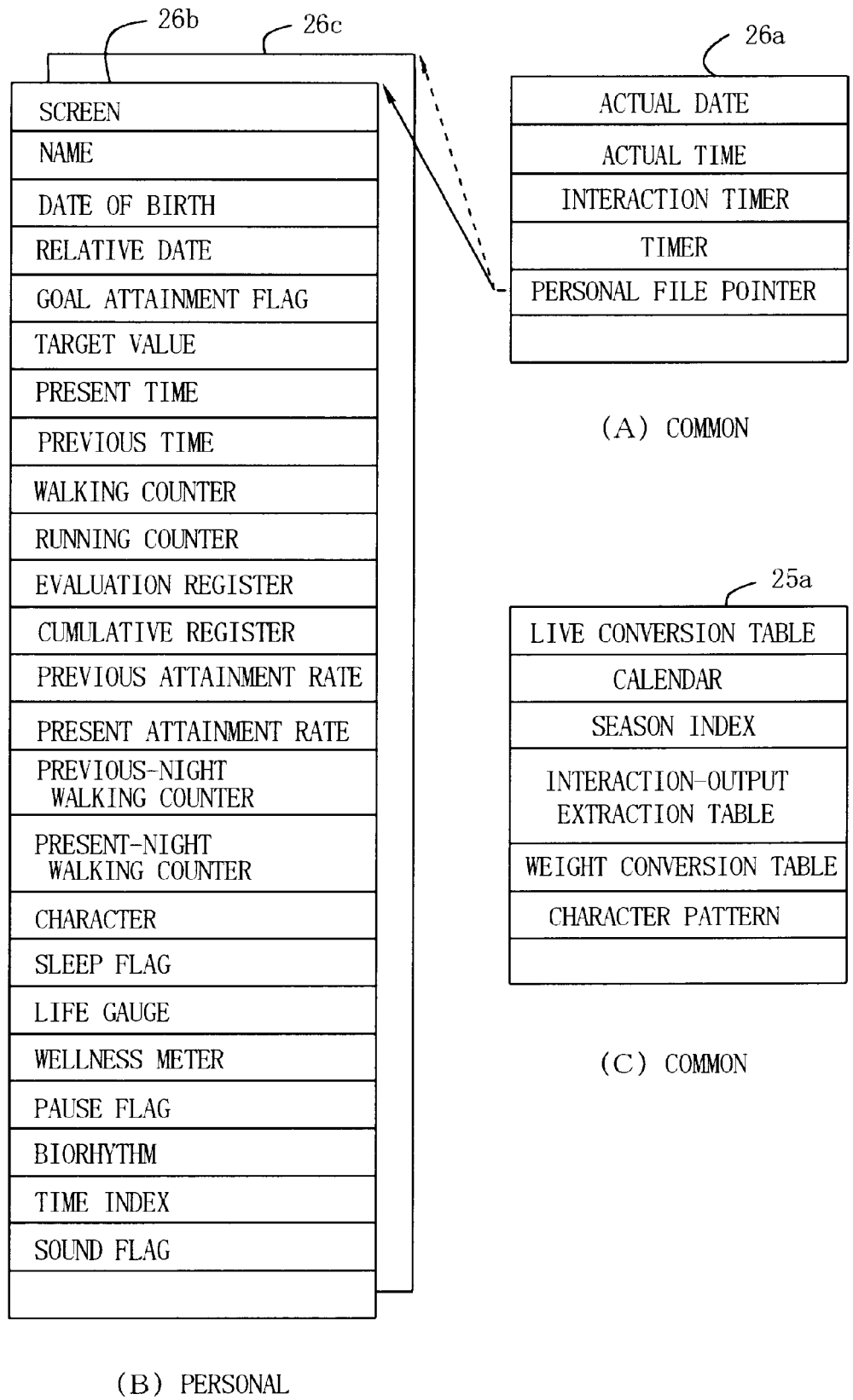
FIG. 4 is a diagram for describing an exercise managing data file according to this embodiment.

FIG. 4 is a diagram for describing an exercise managing data file according to this embodiment. FIG. 4(A) illustrates a command data file each item of the content of which is stored in a register of RAM 26a. To give an overview of this content, "Actual Date" represents the actual date, "Actual Time" represents the actual time (hour, minute and second), "Interaction Timer" represents a timer which generates timing of interaction from a character to the user, "Timer" represents a general-purpose timer, and "Personal File Pointer" represents a pointer for selecting personal data files 26b, 26c, described later.

The content of "Actual Date" and "Actual Time" initially is made to agree with the present year, month, day, hour, minute and second, entered by the user, in clock setting processing, described later. "Actual Time" thenceforth is managed in units of, e.g., 10 ms. When an RTC interrupt is generated at 10-ms intervals, the least significant bit of the actual-time information is incremented by +1 to update the hours, minutes and seconds. The "Actual Date" is updated in accordance with calendar information if necessary.

Though the management processing is not illustrated, the "Interaction Timer" is managed so as to generate a time-out interrupt (internal interrupt) sequentially at a prescribed or random cycle, whereby interaction processing B of FIG. 12(B) is executed on each occasion. For example, if "'Interaction Timer'=10 minutes" is set in a hardware timer counter (not shown) within the CPU 21, the counter will be counted down at intervals of 10 ms. When the content of the counter eventually becomes "0", the time-out interrupt is generated. Furthermore, the timer counter is set to 10 minutes (this value may be changed randomly) afresh by the interrupt acceptance processing, after which control shifts to interaction processing B. It should be noted that the "Interaction Timer" may be managed so as to generate an actual-time interrupt sequentially at prescribed or random times during one day.

One example of actual-time interrupt processing will now be described. When "Actual Time" is updated by the acceptance processing for accepting the RTC interrupt I1, this "Actual Time" and a prescribed time (e.g., 23:59) are compared. If the two agree, date change processing shown in FIGS. 8 to 11 is executed.

FIG. 4(B) illustrates a personal data file relating to management of exercising (training). Each of the items of content are stored in a register of the RAM 26b.

To give an overview of this content, "Screen" represents the designating number of a basic screen usually displayed through an exercise period; "Name" a name entered by the user (the user's own name or a pet name given to a character); "Date of Birth" the date of birth of the user; "Relative Date" a relative date for which the exercise starting date is used as the reference; "Goal Attainment Flag" a flag which indicates whether a goal has been achieved or not; "Target Value" the target value (norm) of one day set in accordance with a user input or automatically by the instrument 10 when the instrument has measured, e.g., three days of exercising by the user; "Present Time" the current time at which the oscillation sensor 31 sensed oscillation; "Previous Time" the previous time at which the oscillation sensor 31 sensed oscillation; "Walking Counter" the number of steps walked by the user; "Running Counter" the number of steps run by the user; "Evaluation Register" the total amount of exercise resulting from one day's walking or running by the user (where the value is calculated in terms of number of steps); "Cumulative Register" the cumulative value of amount of exercise over three days (a monitoring period) that precede the start of exercising and then until the end of exercising; "Previous Attainment Rate" the goal attainment rate of the previous day; "Present Attainment Rate" the present goal attainment rate; "Previous-Night Walking Counter" the number of steps taken after midnight (e.g., from 2:00 to 4:00 A.M.) of the previous day; "Present-Night Walking Counter" the number of steps taken after midnight (e.g., from 2:00 to 4:00 A.M.) of the present day; "Character" a number specifying the form of a virtual organism (character); "Sleep Flag" a flag indicating whether a character is sleeping quietly or awake and active; "Life Gauge" an index indicating a form (physique, life) based upon the state of health of a character; "Wellness Meter" an index indicating expression or motion based upon the psychological state (mood, vigor, vitality, etc.); "Pause Flag" a flag which controls whether enumeration of amount of exercise is valid or invalid; "Biorhythm" a biorhythm that is calculated from the date of birth of the user; "Time Index" an index which indicates one day's change (morning-type, evening-type) in the vigor of a character (i.e., the user); and "Sound Flag" a flag for controlling whether or not sound is output.

It should be noted that a plurality (e.g., two) of personal data files 26b, 26c are provided. Thus, the training regimens of two individuals can be managed by switching between users.

For example, two users can use the instrument 10 on alternate days, with one user being managed by the first file 26b and the other user being managed by the second file 26c. If the two individuals compete and two months pass, the training results for two people (30 days per person) are obtained.

Alternatively, the two files are used by one individual. The first file 26b in this case is for business days of the week (Monday through Friday) and the second file 26c for days off (Saturday and Sunday), with goals being set respectively in dependence upon differences in lifestyle. Thus a plurality of training menus can be managed for one person.

Alternatively, the first file 26b is actually used and the second file 26c is used as a dummy. At the time of actual illness (a cold, stomach ache, etc.) or when the user cannot lead his or her usual life because of a business trip or the like, a changeover is made to the second file 26c and the first file 26b is left as is in the meantime. Various other methods of utilization are also conceivable.

FIG. 4(C) illustrates another common data file which does not change. This is stored in the ROM 25a. To give an overview of the content, "Life Conversion Table" is a table (see FIG. 15) which decides the evolution and form (healthy, obese, etc.) of a character in accordance with the life gauge of the character; "Calendar" a table having calendar information such as days of the week, seasons, holidays, Christmas, Olympics, etc., in accordance with the actual date; "Season Index" an index (see FIG. 16) which indicates ease of living (comfort index, discomfort index, etc.) conforming to season; "Interactive-Output Extraction Table" a table (see FIG. 17) which retains character images and message information extracted at the time of interaction with a character; "Weight Conversion Table" a table (see FIG. 20) for converting character growth and life gauge to weight of the character; and "Character Pattern" various image information (see FIG. 5) relating to character type, evolution, form (growth, physique, etc.), expression, motion (action), character-at-rest and conduct, etc.

Figure 5:
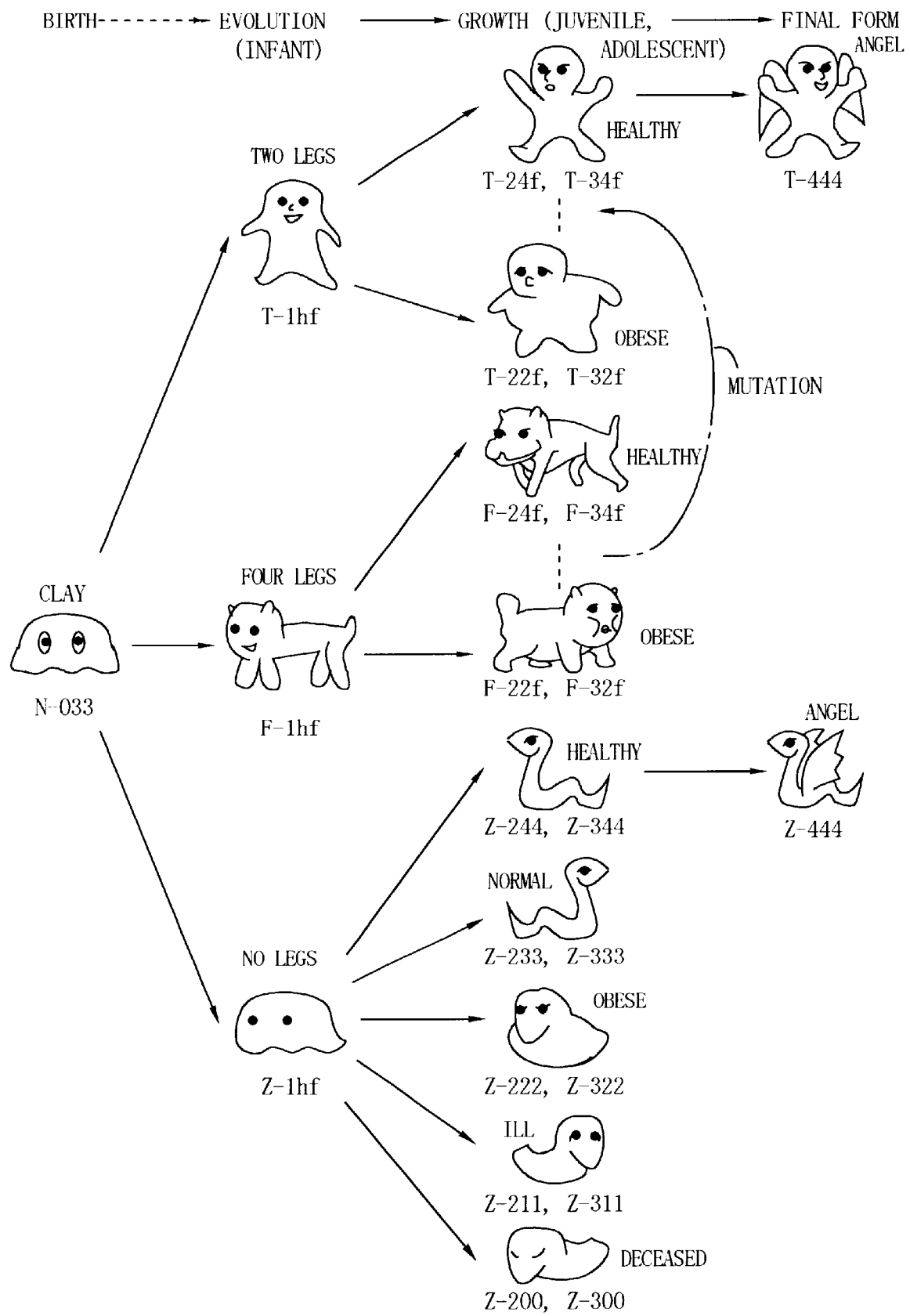
FIG. 5 is a diagram for describing the forms of characters according to this embodiment.

FIG. 5 is a diagram for describing the forms of characters according to this embodiment.

Various character images are stored in the ROM 25 in advance in regard to a time series relating to character, i.e., birth→evolution (infancy)→growth (juvenescent period, adolescent period)→final form (angel). Each of these character images is read out by a designating number (s–ahf).

The initial "s" stands for the species of a character, in which "N" represents an organism (clay) of indeterminate form such as clay, "T" two legs, "F" four legs and "Z" legless organisms (animals in this example). The second "a" stands for a stage in the time series, such as birth, evolution and growth of a character, in which "0" represents birth, "1" evolution (infancy period), "2" juvenescent period, "3" adolescent period, and "4" final form (angel). The third "h" stands for the state of health (physique, etc.) of a character, in which "4" represents healthy, "3" normal, "2" obese, "1" ill and "0" deceased. The state of health of a character is decided based upon the "life gauge". The fourth "f" stands for the state of wellness of a character, in which "4" represents "good-humored", "3" normal, "2" ill-humored and "1" melancholy. The state of wellness of a character is decided based mainly upon a "wellness meter".

Image information on a variety of species, evolution and growth stages, state of health and state of wellness (inclusive of action) can be specified by a combination of the designating numbers "s", "a", "h" and "f". By assigning various information to this designating number "s–ahf" in association with the progress of exercise, in a sense the information becomes one with the user and it becomes possible to express the state of progress of an exercise externally and internally (psychologically) in dynamic and rich fashion via a character whose existence is different from that of the user.

Figure 6:
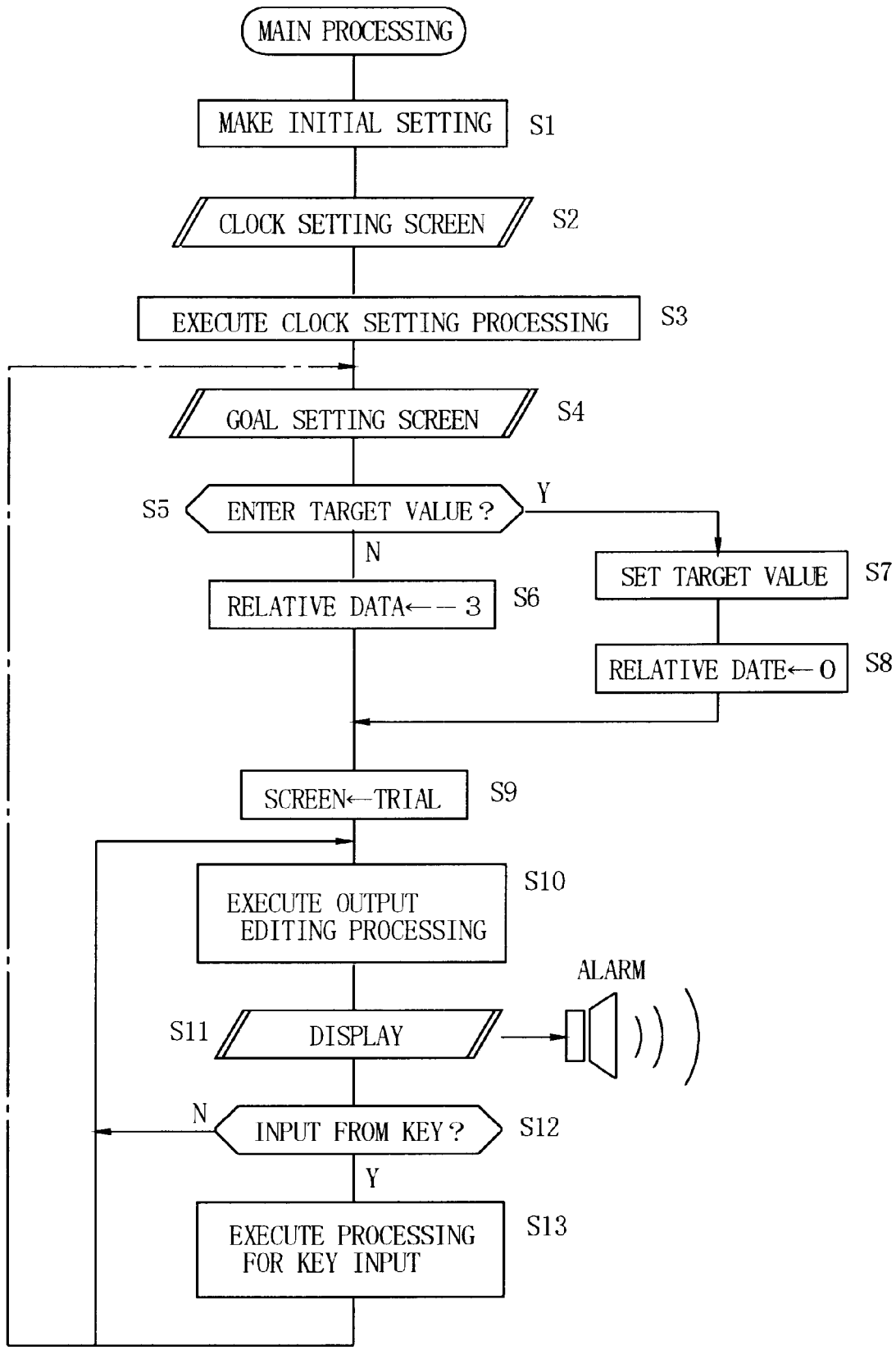
FIG. 6 is a flowchart of main processing according to this embodiment.

FIG. 6 is a flowchart of main processing according to this embodiment.

A transition to this main processing is made when power is introduced to the instrument 10 (or when the battery 33 is inserted or the power switch 34 switched from OFF to ON). Initial setting processing is executed at step S1. For example, the common data file 26a and personal data files 26b, 26c, etc. are created in the RAM 26 and the necessary parameters are set to default values.

A clock setting screen is displayed on the LCD 27 at step S2. If necessary, sound is output to the speaker 29. One example of a clock setting screen is depicted in FIG. 18(A). The user employs keys to enter the year (AD), month and day as well as the present time, and the CPU 21 writes the entered date and time to "Actual Date" and "Actual Time" in RAM 26a at step S3. A goal setting screen is then displayed at step S4. One example of a goal setting screen is illustrated in FIG. 18(B). The user enters his or her own name (or the pet name of a character), his or her own date of birth and, if necessary, a target value (number of steps in one day) at step S5. The CPU 21 writes the entered name and date of birth to "Name" and "Date of Birth" in RAM 26b.

It should be noted that the user need not set a target value at this point in time. In a case where the user does not set a target value, "Relative Date" is made day −3, for example, at step S6. In a case where a target value has been set, the entered target value is set in "Target Value" in RAM 26 at step S7 and "Relative Date" is made day 0 at step S8. The number of a trial screen is set in "Screen" in RAM 26b at step S9.

Output editing processing at step S10 is processing which, in accordance with the designating number of "Screen" in RAM 26b, is for selecting and editing display (and alarm) information necessary for the display screen and outputting the information to the LCDC 28 and/or BBC 30. The edited information is displayed on the LCD 27 and, if necessary, sound is output to the SPK 29, at step S11.

On the first day that power is introduced to the instrument, a trial screen is displayed at step S11 as a result of the "'SCREEN'←TRIAL" processing of step S9. One example of a trail screen is shown in FIG. 18(C). Information such as today's date, actual time, actual number of steps (the content of the evaluation register) is selected and displayed on the LCD screen. In passing, the display of actual number of steps is incremented in dependence upon the number of steps when the user is walking. If the user runs, however, the number of steps is increased at the rate given by (number of steps)×(1.5 to 2.0) During the trial period the user uses the instrument 10 freely and can practice how to use the instrument with a view to starting an exercise regimen.

In this example, the user has not set a target value. Accordingly, the fact that the relative date until the start of training is equal to day −3 is displayed and a monitoring period (three days) for the purpose of setting a goal starts from the next day (day −2). If the user has set a target value, the fact that the relative date is equal to day 0 is displayed and training starts from the next day (day 1) It is determined at step S12 whether an input has been made from a key. In case of no input from a key, control returns to step S10. If the user walks during this interval, the content of the "Walking Counter" is increased and the number of steps displayed at step S11 is updated in real time. In a case where input from a key has been discriminated at step S12, the information input from the key is analyzed and the corresponding key input processing is validated at step S13. The processing for dealing with the key input will be described later. If the reset key is pressed during use of the instrument 10, control returns to step S4 so that entry of a name and setting of a goal can be redone.

Figure 7:
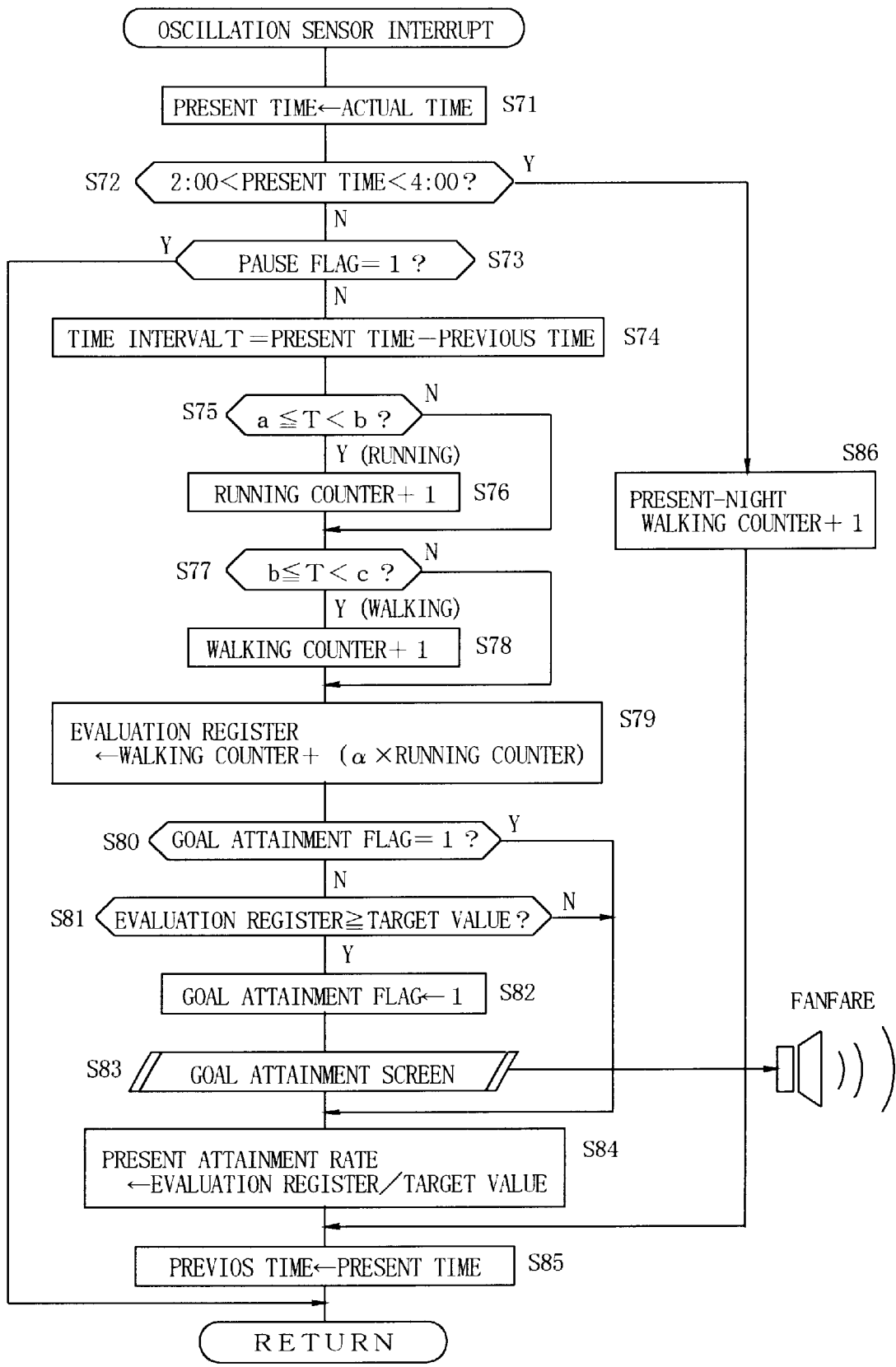
FIG. 7 is a flowchart of exercise enumeration processing according to this embodiment.

FIG. 7 is a flowchart of exercise enumeration processing according to this embodiment.

If the output signal S from the oscillation sensor 31 changes from "0" to "1", the sensor interrupt I2 is generated and is applied to interrupt processing for this oscillation sensor. The interrupt is accepted by the CPU 21 with the highest priority.

At step S71, "Actual Time" in RAM 26a is set in "Present Time" of RAM 26b. As a result, "Present Time" retains the current oscillation detection time. It is determined at step S72 whether "Present Time" is between 2:00 and 4:00 AM, by way of example. If the present time does not fall within these limits, it is determined at step S73 whether "Pause Flag"=1 (pause in effect) holds. If a pause is in effect, exercising is not enumerated and, hence, control returns to the processing that preceded interrupt processing. In order that oscillation (rocking, etc.) other than true exercise oscillation as sustained when the user is riding on a train or the like will not be inadvertently enumerated by the instrument 10, the "Pause Flag" can be set/reset at any time. Thus, only the amount of true exercise performed during everyday life will be enumerated.

If a pause is not in effect, processing for enumerating oscillation is performed. That is, a time interval T of oscillation from the preceding point in time to the present point in time is obtained at step S74 in accordance with time interval T="Present Time"−"Previous Time". Here the "Previous Time" retains the previous oscillation detection time. At step S75, first it is determined whether a≦T<b holds in regard to the time interval T obtained. Here "a" is a threshold value, e.g., 0.2 s, which is for distinguishing between simple bustling motion of both feet and ordinary running motion. It also functions to eliminate a chattering output from the oscillation sensor 31. Further, "b" represents a threshold value, e.g., 0.5 s, which is for distinguishing between ordinary running motion and ordinary walking motion. If it is determined at step S75 that a≦T<b holds, the "Running Counter" is incremented by +1 at step S76. If a≦T<b does not hold, the processing of step S76 is skipped.

Next, it is determined at step S77 whether b≦T<c holds in regard to the time interval T obtained. Here "c" represents a threshold value, e.g., 2 s, which is for distinguishing between ordinary walking motion and other motion, e.g., oscillation produced sporadically over comparatively long intervals. If it is determined at step S77 that b≦T<c holds, the "Running Counter" is incremented by +1 at step S78. If b≦T<c does not hold, the processing of step S78 is skipped. Thus, unnatural oscillation is not enumerated; only oscillation that is based upon natural oscillation such as walking or running is enumerated.

The value of ("Walking Counter"+α×"Running Counter") is stored in "Evaluation Register" at step S79. Here α represents a coefficient for calculating a number of steps that have been run in terms of a number of steps that have been walked. For example, α=1.5 to 2.0. It is determined at step S80 whether "Goal Attainment Flag"=1 holds. In case of Goal Attainment Flag"=0, it is determined at step S81 whether "Evaluation Register"="Target Value" holds.

In this embodiment, the device is initialized to "Target Value"=FFFFH (where H represents a hexadecimal) prior to a manual or automatic setting and at this point in time, therefore, "Evaluation Register"="Target Value" cannot hold. Processing in this interval, therefore, proceeds to step S84. On the other hand, if "Relative Date" is a day from the first day onward, then "Target Value" will have been set. If "Evaluation Register"="Target Value" is determined to hold at step S81 in this case, then "Target Attainment Flag"=1 is established at step S82. The goal attainment screen is displayed temporarily and fanfare is output from the SPK 29 at step S83. Accordingly, the user is informed in real-time of the instant of goal attainment. "Present Attainment Rate"=("Evaluation Register")/("Target Value") is obtained at step S84. This "Present Attainment Rate" is obtained continuously both prior to goal attainment (when "N" is the decision rendered at step S81) and after goal attainment (when "Y" is the decision rendered at step S80). Thus "Present Attainment Rate" is updated in real time. "Present Time" in RAM 26b is stored in "Previous Time" at step S84.

In a case where it is determined at step S72 that "Present Time" is between 2:00 and 4:00 A.M., the "Present-Night Walking Counter" is incremented by +1 at step S86 and control proceeds to step S85. In this embodiment, the filtering processing of steps S75, S77 is not applied to oscillation during this period of time. Consequently, not only ordinary walking and running but even oscillation such as bustling motion of both feet and irregular disco dancing or the like are enumerated as simple nighttime pleasure seeking and are not treated as the exercise regimen. Since oscillation during this period of time is counted unconditionally irrespective of the "Pause Flag", the user is coaxed to lead a more healthy life.

In this embodiment, the time interval T of oscillation is obtained in accordance with the calculation T="Present Time "−"Previous Time", though this does not impose a limitation. For example, a hardware timer circuit for counting pulse intervals in the output of the oscillation sensor 31 may be provided. This timer circuit would be restarted whenever oscillation is sensed and would then count the time up to the next time oscillation is sensed. A timer interrupt would be generated in a case where the counted time T satisfies a≦T<c, but no timer interrupt would be generated in any other cases. Providing such a hardware timer circuit makes it possible to simplify and speed up the oscillation sensor interrupt processing of FIG. 7. In addition, the registers for "Present Time" and "Previous Time" in RAMs 26b, 26c can be eliminated.

FIGS. 8 through 11 are flowcharts (1) to (4) of processing for changing date according to this embodiment. When "Actual Time" in RAM 26a comes to indicate the end of the day (e.g., 23:59), a transition to this date changing processing is made.

Figure 8:
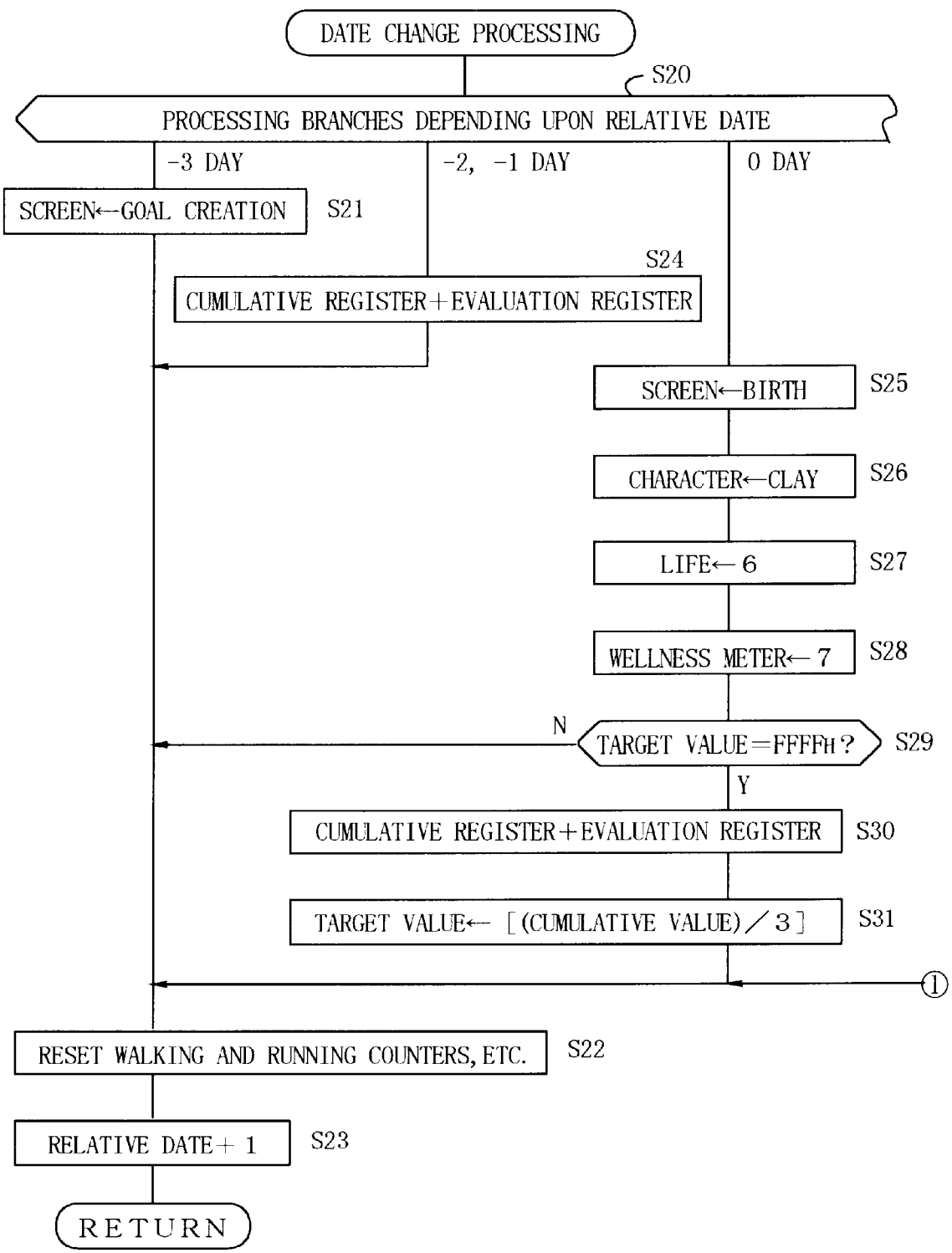
FIG. 8 is a flowchart (1) of processing for changing date according to this embodiment.

In FIG. 8., processing branches at step S20 in conformity with the "Relative Date" in RAM 26b. In case of "Relative Date"=day −3, the target creation screen is set in "Screen" of RAM 26b at step S21. The "Walking Counter", "Running Counter", "Present-Night Walking Counter" and "Evaluation Register" are reset at step S22. "Relative Date" is incremented by +1 and control returns to the processing that preceded date changing processing at step S23. One example of a target creation screen is illustrated in FIG. 18(D). Actual date, actual time, relative date (day −2) up to the start of exercising, today's number of steps (the content of the "Evaluation Register") and message information to the effect that target creation is in progress are displayed on this screen.

With reference again to FIG. 8, if "Relative Date"=day −2, −1 holds, the content of "Evaluation Register" on this day is added to the "Cumulative Register" at step S24 and control proceeds to the processing of step S22, which is the same for each of these days.

In a case where "Relative Date" =day 0 holds, this means midnight prior to the start of the exercise regimen. Birth is set in "Screen" at step S25 and an indeterminate organism (clay) is set in "Character" at step S26. An initial value (e.g., 6) is set in "Life Gauge" at step S27, and an initial value (e.g., 7) is set in "Wellness Meter" at step S28.

It is determined at step S29 whether "Target Value"= FFFFH holds. In case of "Target Value"≠FFFFH, a target value will already have been set manually by the user and, hence, control proceeds to step S22. In a case where "Target Value"=FFFFH holds, this means a target value has not been set. At step S30, therefore, the content of the "Evaluation Register" of the third day is added to "Cumulative Register". "Target Value"=[(cumulative value)/3] is obtained at step S31.

The symbol [ ] represents processing for raising fractions below the 100's place to 1000 steps or cutting these off to zero steps. The relationship between "Actual Date" in RAM 26a and the "Calendar" information in ROM 25 preferably is taken into consideration in making this decision. For example, in a case where "Actual Date" belongs to a season (March 1st to May 31st and September 1st to November 30th) suited to exercising, fractions are raised; they are discarded in other cases. Accordingly, if the average value over three days is equal to 5326 steps, the "Target Value" will be 6000 steps or 5000 steps depending upon the season. The user thenceforth enters upon the first day of exercising (training). One example of a display screen (basic screen) for birth of a character is illustrated in FIG. 18(E). Here content such as target value, relative date, character (clay) and life gauge (heart symbols) are displayed.

It should be noted that in output editing processing (step S10 in FIG. 6) following character birth, the "Sleep Flag" in FIG. 4 is examined. In case of "Sleep Flag"=0 (awake), an energetic character such as one which moves around the screen is displayed. In case of "Sleep Flag"=1 (sleeping), a sleeping character such as shown in FIG. 19(F) is displayed instead. Control of the "Sleeping Flag" is described in FIG. 14. In output editing processing from the trial screen onward, the "Pause Flag" is examined. In case of "Pause Flag"=1 (pause in effect), the letter "P" is displayed on part of the screen, whereby the user can ascertain that a pause is in effect. In case of "PauseFlag"=0 (pause not in effect), the letter "P" is not displayed.

Figure 9:
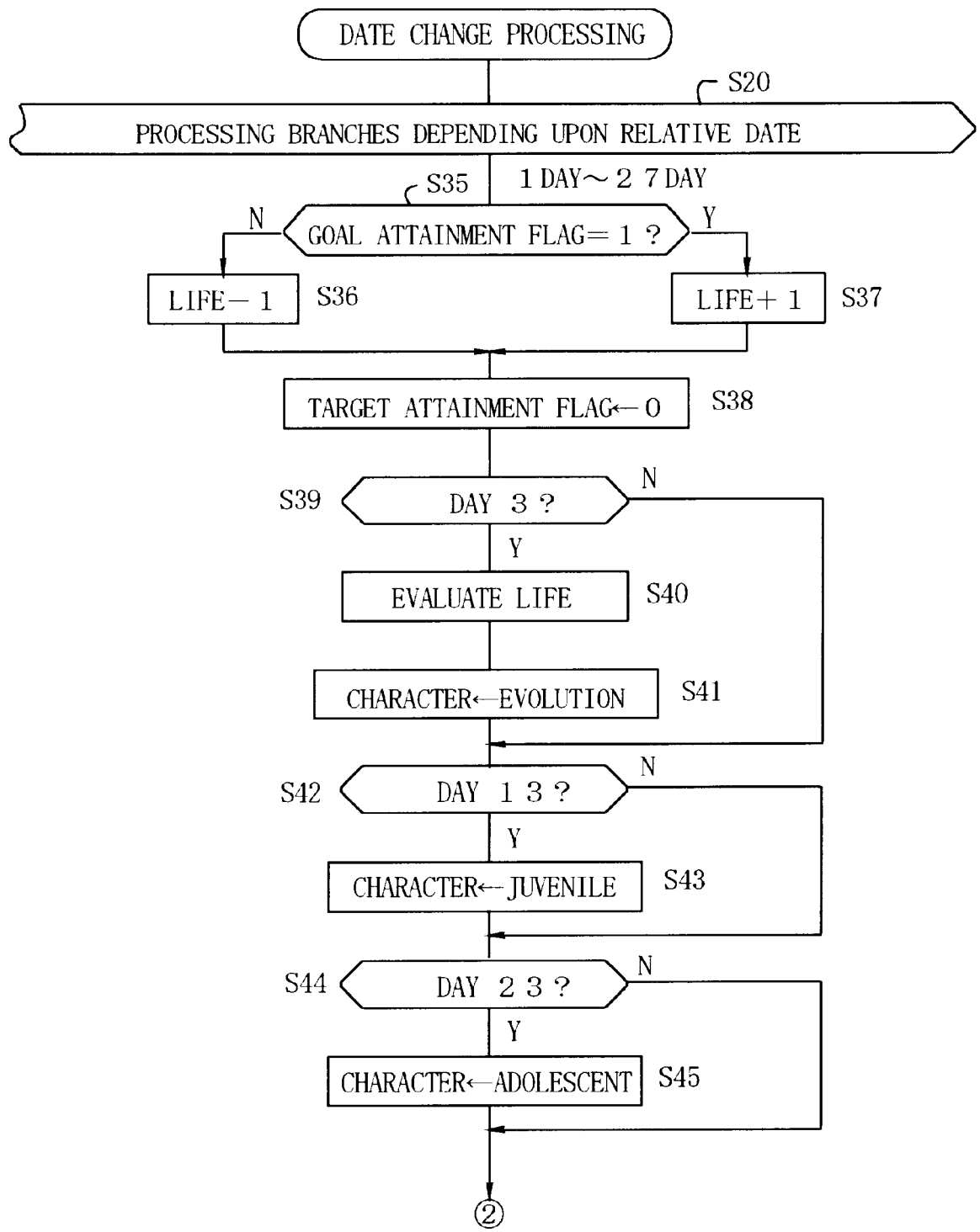
FIG. 9 is a flowchart (2) of processing for changing date according to this embodiment.

Proceeding to FIG. 9, it is determined at step S35 whether "Goal Attainment Flag"=1 holds in a case where "Relative Date"=day 1 to day 27 (the final day in this example) holds. If goal attainment flag=0 (goal unattained) holds, "Life Gauge" is decrementedby −1 at step S36. If goal attainment flag=1 (goal attained) holds, "Life Gauge" is incremented by +1 at step S37. The "Goal Attainment Flag" is reset at step S38. Thus, irrespective of the number of steps taken that day, "Life Gauge" varies depending upon whether the goal is attained or not. For this reason the instrument 10 is more like an exercise assisting meter that places importance upon goal attainment.

It is determined at step S39 whether "Relative Date"=day 3. In case of day 3, "Life Gauge" is evaluated at step S40. The evaluation is that this is the third day (character evolution) following the start of exercising. On the basis of the result of evaluation of "Life Gauge", the number of evolution corresponding to "Character" is set sing a life conversion table, described below.

FIG. 15 is a diagram for describing the life conversion table according to this embodiment.

FIG. 15(A) illustrates a life conversion table used when a character evolves. By way of example, when "Life Gauge" =8 holds, clay, which has been the common character thus far, evolves to a character representing "two legs; infant; normal". When "LifeGauge"=7 holds, the same clay evolves to a character representing "four legs; infancy; normal". Evolution occurs in similar fashion from this point onward. The fact that a daily goal has or has not been attained in the three days following the start of exercising appears as evolution to a different species irrespective of the magnitude of the set target value. Accordingly, exercising seriously every day is advisable. If the user grows lazy, he or she cannot evolve into a human being. Moreover, once a lower species (four legs or no legs) has been decided, mutation to a higher species cannot be achieved through ordinary effort. Consequently, a user who has become lazy in this interval of time comes to appreciate the importance of attaining the daily goal. One example of a display screen at the time of evolution is shown in FIG. 18(F). A lively two-legged juvenile character moves about the screen, and eight heart symbols corresponding to "Life Gauge"=8 light up. A target value or present number of steps also is displayed concurrently if necessary. The form (state of health) of the character from the fourth day onward varies in accordance with the "Life Gauge" from day to day. Furthermore, it is also possible to change the character or motion of the character in accordance with the "Wellness Meter".

FIG. 15(B) illustrates a life conversion table used in a growth period (the fourth day onward following the start of exercising). By way of example, when "Life Gauge"=8 holds, the character grows to "n legs; healthy" (where n=2/4/none). When "LifeGauge"=7 to 6 holds, the character grows to "n legs; normal". If "LifeGauge"=3 holds because of laziness, then illness results. If "Life Gauge"=0 holds, the character dies.

With reference again to FIG. 9, it is determined at step S42 whether "Relative Date"=day 13 holds. In case of day 13, an n-legged juvenile is set in "Character" at step S43 and a jingle about the joys of growth is set as the audio data at step S43. It should be noted that since the character is sleeping during this period of time, the growth screen and the sound of joy are output the next morning. In case of "Relative Date"≠day 13, this processing is skipped. One example of a display screen for when growth to a juvenile is achieved is illustrated in FIG. 18(G). The user can directly experience that exercising is accumulating day by day through the growth of the character on the screen.

It is determined at step S44 whether "Relative Date"=23 holds. In case of day 23, an n-legged young man is set in "Character" at step S45 and a jingle about the joys of growth is set as the audio data at step S45. In case of "Relative Date"≠day 23, this processing is skipped. One example of a display screen for when growth to a young man is achieved is illustrated in FIG. 18(H). Since the user has become lazy at this time, however, the character grows obese and is not lively on this particular day.

Figure 10:
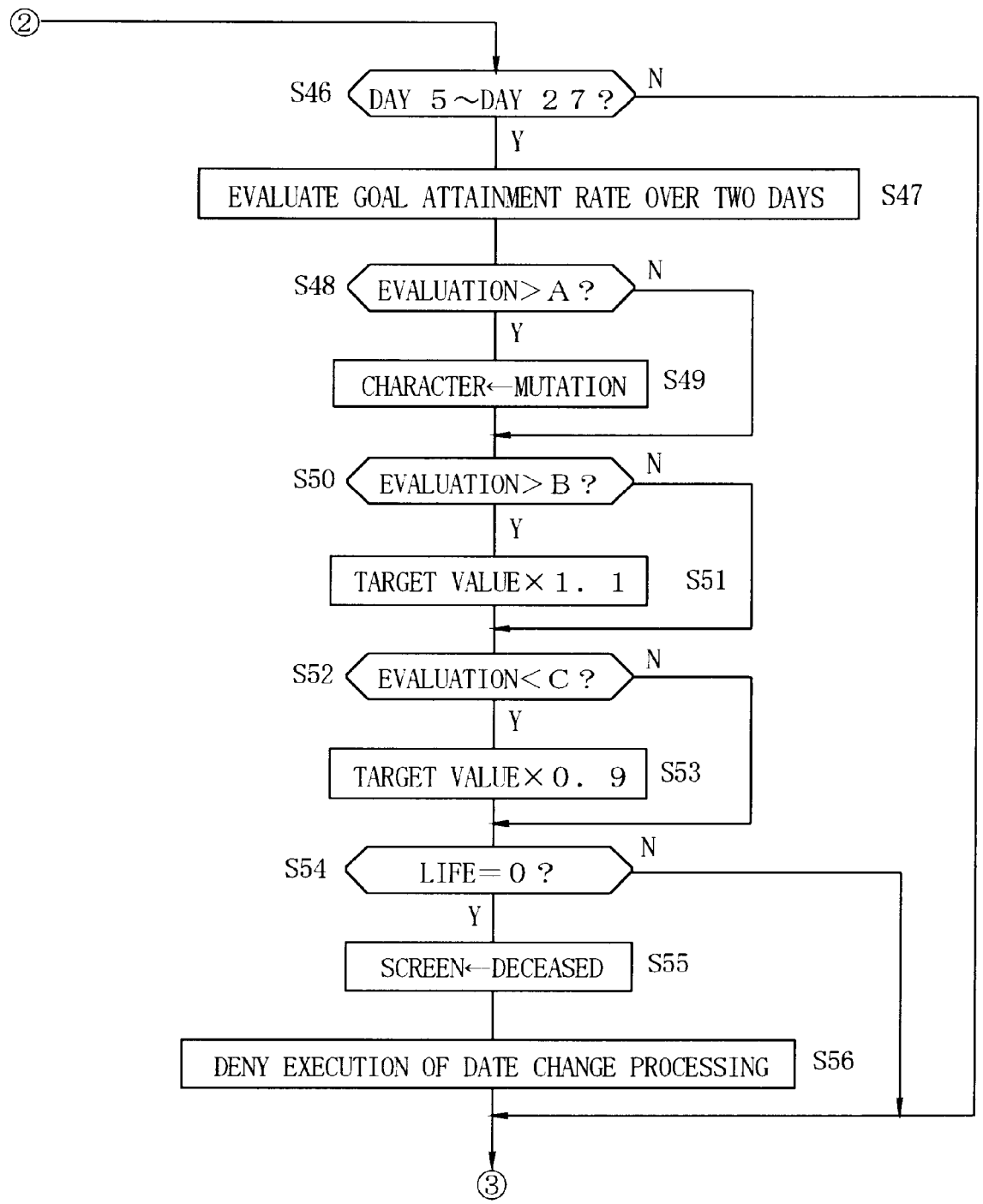
FIG. 10 is a flowchart (3) of processing for changing date according to this embodiment.

Proceeding to FIG. 10, it is determined at step S46 whether "Relative Date"=day 5 to day 27 (the final day) In case of day 5 to day 27, the goal attainment rate over two days, namely at the present time and the day before, is evaluated at step S47. It is determined at step S48 whether Evaluation>A holds. For example, in case of "Previous Attainment Rate"≧150% and "Present Attainment Rate"≧150%, the relation Evaluation>A is satisfied. In this case a mutation (to a species one rank higher) is set in "Character" at step S49. However, if the character is currently the highest species, mutation to a higher species is not possible. Though it is permissible for the form (health) of a character at the time a mutation has occurred to be the lowest rank (ill) of a higher species, in this example the form is in accordance with the "Life Gauge" at this point in time. Though mutation to a species one rank lower than that of the character may be provided, in this embodiment it is not provided. Consequently, unless the user can maintain a certain pace after striving carelessly, the character will die. In order to gain a mutation, therefore, considerable preparedness is required.

If it is determined at step S48 that Evaluation>A does not hold, then it is determined at step S50 whether Evaluation>B holds. For example, in case of "Previous Attainment Rate"≧120% and "Present Attainment Rate">120%, the relation Evaluation>B is satisfied. In this case "Target Value" is changed to, e.g., 1.1 times the present value at step S51. As a result, even in case of a target value (norm) set low by the user or by the instrument, the target value can be raised automatically in the course of an exercise.

If it is determined at step S50 that Evaluation>B does not hold, then it is determined at step S52 whether Evaluation<C holds. For example, in case of "Previous Attainment Rate"<80% and "Present Attainment Rate"<80%, the relation Evaluation<C is satisfied. In this case "Target Value" is changed to, e.g., 0.9 times the present value at step S53. As a result, even in case of a target value (norm) set high by the user or by the instrument, the target value can be lowered automatically in the course of an exercise. Thus, by making it possible to change the norm in mid-course, boredom due monotonous exercising can be eliminated.

If it is determined at step S52 that Evaluation<C does not hold, then it is determined at step S54 whether "Life Gauge"=0 holds. In case of "Life Gauge"=0, the character dies. Deceased is set in "Screen" and a sad jingle is set as the audio data at step S55. The character displayed in this case dies with n legs intact. One example of a display screen when a two-juvenile dies is shown in FIG. 19(A). It should be noted that in a case where an expression to the effect that failure at exercising is equal to death of a character is too direct (extreme), an expression that signifies failure indirectly, such as leaving a letter behind and running away from home, may be used. Validation of date changing processing is denied at step S56. "Relative Date" thenceforth does not advance, the screen freezes and the exercise regimen essentially ends. A user whose exercising has ended in the death of a character is left with a feeling of great dejection and unsatisfactory health. It should be noted that if the decision rendered at step S46 is that "Relative Date" is equal to a day other than day 5 to day 27, the decision steps mentioned above are not executed.

Figure 11:
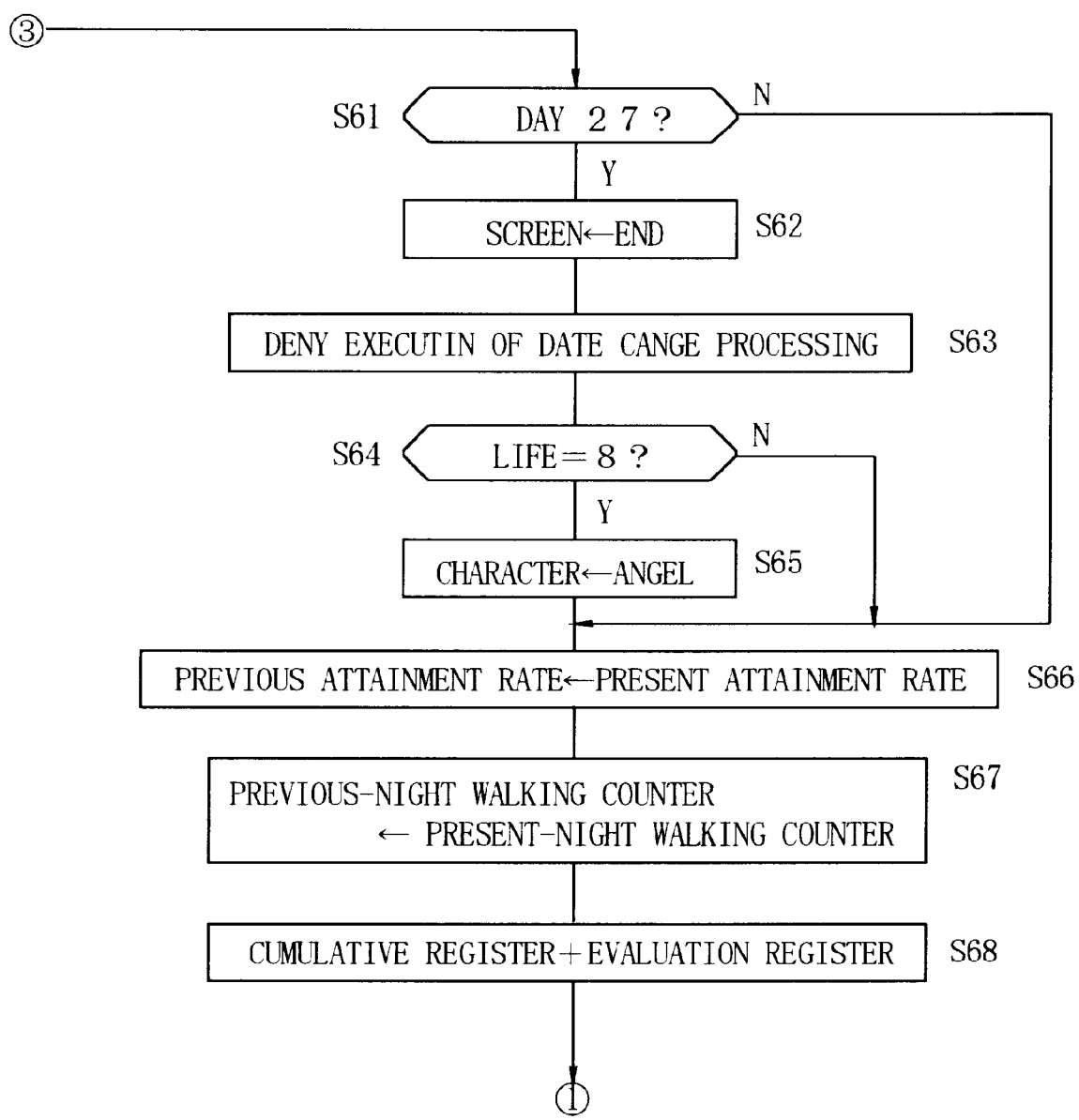
FIG. 11 is a flowchart (4) of processing for changing date according to this embodiment.

Proceeding to FIG. 11, it is determined at step S61 whether "Relative Date"=day 27 (the final day) holds. In case of "Relative Date"=day 27, termination is set in "Screen" at step S62 and execution of date changing processing is denied at step S63. It is determined at step S64 whether "Life Gauge"=8 holds. In case of "Life Gauge"=8, an n-legged angel is set in "Character" at step S65. One example of a display screen for the final form of a two-legged young man is illustrated in FIG. 19(B). The angel has grown wings as if praising the accomplishment of the user. A user whose exercising has ended in an angel is left with a feeling of great satisfaction and satisfactory health. In case of "LifeGauge"≠8, exercise ends in an n-legged young man as is. If it is determined at step S61 that "Relative Date"≠day 27 holds, the above-described processing is skipped.

"Present Attainment Rate" is set in "Prior Attainment Rate" and "Present Attainment Rate" is reset at step S66. "Present-Night Walking Counter" is set in "Previous-Night Walking Counter" at step S67 and "Present-Night Walking Counter" is reset at step S67. "Evaluation Register" is added to "Cumulative Register" at step S68 and control returns to step S22 in FIG. 8.

It should be noted that the processing of steps S50 to S53 in FIG. 10 may be eliminated. "Target Value" in such case cannot be changed during the course of exercising. It can be said that this is the method preferred by users who are accustomed to exercising.

Further, the processing of steps S54 to S56 may be eliminated. In this case, if the user perseveres even after the character has died, the character can be revived. At any rate, exercising can be continued until the final day. It can be said that this is the method preferred by beginners.

Figure 13:
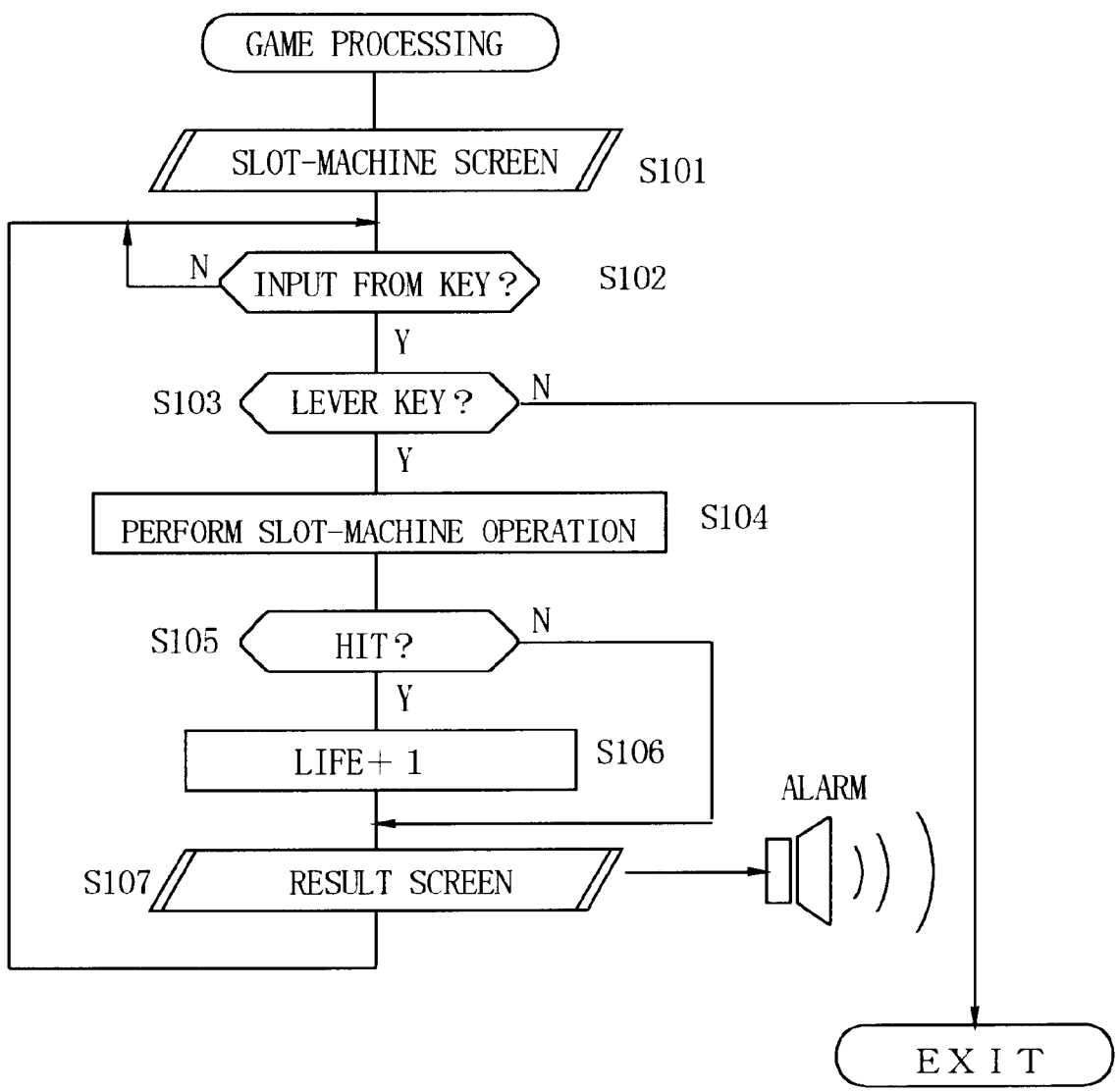
FIG. 13 is a flowchart (2) of character interaction processing according to this embodiment.

FIGS. 12 and 13 are flowcharts (1), (2) of character interaction processing according to this embodiment. Since the character has a life of its own on the screen, basically the character cannot be controlled directly. However, if the "OK" key is pressed on, say, a basic screen on which the character is active, the expression of the character, text messages and sounds will be issued depending upon the state of wellness of the character.

FIG. 12(A) is a flowchart of interaction processing A. A transition to this processing is made when the "OK" key is pressed on the basic screen on which a character is active. "Wellness Meter" is updated at step S91.

FIG. 16 is a diagram for describing the wellness meter according to this embodiment. The "Wellness Meter" is a 10-stage index indicating the wellness (mood, vigor, vitality, etc.) of a character (i.e., the user) and is changed subtly by various factors described below.

FIG. 16A illustrates the "Biorhythm" of the user. This obtained from the "Date of Birth" of the user. The portion corresponding to the "Actual Date" (e.g., March 23rd) is stored in RAM 26. Though a biorhythm comprises various periodic curves representing creativity, emotions and the like, a curve representing emotion, for example, is utilized. Alternatively, each curve may be analyzed and wellness curves may be generated anew. "Season Index" in FIG. 16(B) illustrates degree of comfort conforming to season. The portion corresponding to "Actual Date" is read out of the ROM 25. In general, spring (March through May) and autumn (September through November) are comfortable and one's mood is considered to be refreshed. Since winter (December through February) is cold, one is confined to one's home, there is little opportunity for exercise and going outside is troublesome. Further, June is the rainy season, July is very hot and August brings the heat of late summer. The discomfort index is high for these months, one loses stamina (becomes weary from the heat) and loses vigor. "Time Index" in FIG. 16(C) indicates vitality (vigor) conforming to time over one day. One day's curve is stored in RAM 26 and the portion corresponding to "Actual Time" is read out of RAM 26. Though a method of generating the "Time Index" is not illustrated, such an index can be analyzed and generated easily by obtaining daily activity patterns (e.g., histograms of "Number of Steps Walking" and "Number of Steps Running" per hour) during the user monitoring period and the following exercising period. Since the user in this example tends to exhibit little activity in the morning and much activity at night, the curve is of the type indicating activity at night, as illustrated. An even simpler expedient is to store ordinary morning-and evening-type curves beforehand and have the user select one on the goal setting screen.

FIG. 16(D) illustrates daily goal attainment rate. "Previous Attainment Rate" of the previous data and "Present Attainment Rate" of the present day are retained in the RAM 26b. FIG. 16(E) illustrates a daily "Night WalkingCounter". "Previous-Night Walking Counter" of the previous day and "Present-Night Walking Counter" of the present day are retained in the RAM 26b.

Basically, the "Wellness Meter" is obtained based upon a weighted evaluation of each of the values of the above-mentioned "Biorhythm", "Season Index" and "Time Index" and "Goal Attainment Rate Evaluation". Here the first weight of weighted evaluation is placed on evaluation of goal attainment rate. For example, goal attainment rate is evaluated by whichever of "Previous Attainment Rate" and "Present Attainment Rate" is larger.

This method of evaluation will be described in detail in accordance with FIG. 16(D). In the morning of the present day (day 23), this day's exercising has not yet been expended and therefore the "Present Attainment Rate" is a low 40%. If the "Previous Attainment Rate" (day 22) is 100% or greater in this case, the evaluation (wellness meter) of goal attainment rate will be high and the character will be high-spirited starting from the morning. In this example, however, the "Previous Attainment Rate" is a low 60% and, hence, the character is low-spirited in the morning of this day. The feeling of a user who did not attain the goal the previous day shows up in the expression and conduct of the character. Here the user on the present day perseveres in exercising in the latter half of the day. As a result, the "Present Attainment Rate" rises rapidly, eventually surpasses the "Previous Attainment Rate" and approaches 100%, whereupon the "Wellness Meter" also rises and the character becomes high-spirited.

The second weight of weighted evaluation is placed on "Biorhythm", for example. If the evaluation of goal attainment rate is high and "Biorhythm" also is high, so is "Wellness Meter" and the character is in the best possible condition. On the other hand, if the evaluation of goal attainment rate is high but "Biorhythm" is low, "Wellness Meter" does not rise very much and the character's condition does not improve very much. Conversely, if the evaluation of goal attainment rate is low but "Biorhythm" is high, "Wellness Meter" rises unusually and the character appears not to mind non-attainment of the previous day's goal.

The third weight of weighting evaluation is placed on "Time Index", for example, as a result of which one day of vigorous rhythm of the user is taken into account in "Wellness Meter". For example, the mood of a night person is not good in the morning. In this case, even if the evaluation of goal attainment rate is high, for some reason the character does not achieve the best condition in the morning. When afternoon arrives, however, the condition of the character improves in the same manner as that of the user.

The fourth weight of weighting evaluation is placed on "Season Index", for example, as a result of which a sense of the season is taken into account in "Wellness Meter". It is difficult to attain the best condition during the rainy season or in the period when one becomes weary from the heat.

A random number may also be taken into account as a fifth weight of weighting evaluation. If a random number is taken into account, "Wellness Meter" also will fluctuate irregularly, although only slightly, and the character will exhibit some capriciousness.

It should be noted that "Life Gauge" may be taken into account in the evaluation of "Wellness Meter" described above. However, when reference is made to the actual life of a human being, there are instances where the character is low-spirited even though the form of the character is healthy, and it is possible for the form of a character to exhibit good spirits even though the character is obese. Accordingly, in this embodiment, "Wellness Meter" and "Life Gauge" are treated separately. That is, "Life Gauge" represents state of health which is an accumulation of evaluation of goal attainment/non-attainment over a longer span of time. "Wellness Meter", on the other hand, places importance on "Previous Attainment Rate" and "Present Attainment Rate" and represents emotional state over a shorter span of time. "Night Walking Counter in FIG. 16(E) can be said to be a parameter for evaluating conduct rather than the spirits of the character. If the "Previous-Night Walking Counter" or "Present-Night Walking Counter" surpasses 200 steps, for example, the character is evaluated as showing delinquent tendencies. Even if the user is serious today, the delinquency evaluation will not soon be removed if the user was pleasure seeking the previous night.

With reference again to FIG. 12, output information indicative of interaction responses is extracted at step S92. Output information indicative of interaction responses includes not only characters but also text messages.

FIG. 17 is a diagram for describing an interaction-output extraction table according to this embodiment.

In the processing of step S92 for extracting output information, one, two or more items that satisfy "Conditions" are extracted in regard to "Evaluated Elements" in this table, these are selected in accordance with a predetermined order of priority (e.g., a cyclic order of priority in which an item once output is placed at the tail end), or are selected randomly, and then output. The updated "Wellness Meter" mentioned above also is included in "Evaluated Elements".

Processing for extracting output information at step S92 will now be described in detail. First, by way of example, the following items are extracted as satisfying the respective "Conditions" in regard to the "Evaluated Elements" of the table:

"Congratulations on attaining your norma!" (text message) if "Present Attainment Rate"=100% holds;

"Picture of a delinquent character" if "Previous-Night Walking Counter"=200 steps holds;

"Walked from Nihonbashi to Kyoto" if n3="Cumulative Register"=n4 holds;

"Don't keep such late hours" (evening greeting) if "Actual Time"=evening holds;

"Spring languid all day!" (seasonal greeting) if "Actual Date"=spring holds;

"03-1234-5678" (number of special telephone service) if there is no condition; and "lun lun lun" (mood or encouragement message) if there is no condition.

With reference again to FIG. 12, first "Congratulations on attaining your norm!", for example, is selected and displayed on the LCD display at step S93. In case of a musical note symbol, the corresponding sound is output to the SPK 29 at the same time. The next input from a key is awaited at step S94. If there is an input from a key, it is determined at step S95 whether the key is an add-on key. If the key is the "OK" key on the interaction response screen, then this key is the add-on key. In case of the add-on key, the selection of the output information is changed at step S96 and control returns to step S93. In this example, the image of a "Delinquent Character" is displayed next at step S93. Even though the user has been complemented, the user's nighttime pleasure seeking has been found out. Similar processing continues. When it is eventually determined at step S95 that a key is not the add-on key, this processing is exited.

Examples of display screens for interaction response processing are shown in FIGS. 19(C) to (E).

In order for a character image on the interaction response screen in this embodiment to express the internal mood or conduct of a character more richly and with a deeper impression, the character appears as an image having a greater freedom of expression (a more abstract image) without being confined to the species or form (physique, growth) of characters shown on the basic screen. In addition, the character performs various actions in dependence upon the mood of the character.

FIG. 19 (C) shows a state in which "Wellness Meter"=7 (cheerful). The character has a smiling face, frequently acts happily and occasionally does somersaults. The heart symbols correspond to the "Wellness Meter".

FIG. 19(D) shows a state in which "Wellness Meter"=4 (lazy). The character usually appears dissatisfied, often dozes off and frequently acts unhappily. If oscillation is applied to the instrument 10 while the character is dozing, the character suddenly jumps up. Processing for this control is not illustrated but can be implemented with ease by detecting an increase in "Evaluation Register" while the character is dozing.

FIG. 19(E) shows a state in which the character is tending toward "Delinquency". A pall is cast over the screen and a squatting boy wearing sunglasses is smoking a cigarette. The user who has become aware of the delinquency of the character repents his or her own nighttime pleasure-seeking and refrains from such pleasure seeking the next day.

In a case where the character is sleeping quietly ("Sleep Flag"=1), basically this interaction processing A is not executed. However, it is permissible to adopt an arrangement wherein the interaction processing A is executed, in which case the user receives the impression of interacting with a sleeping character while dreaming.

FIG. 12 (B) is a flowchart of interaction processing B. A transition to this processing is made by an interrupt when a timer that operates in the "Interaction Timer" of RAM 26*a* times out.

Interaction processing B, which is independent of operation of the "OK" key by the user, includes updating "Wellness Meter" to an appropriate timing utilizing the internal "Interaction Timer", extracting one, two or more items of output information which satisfy conditions, adding a text message to a character being displayed on the basic screen, or automatically applying a change that conforms to the "WellnessMeter" to the expression or action of the character being displayed. "Wellness Meter" is updated at step S97 in a manner similar to that of step S91, and output information is extracted at step S98 in a manner similar to that of step S92. At this time the interaction-output extraction table of FIG. 17 may be used or an interaction-output extraction table exclusively for this processing may be separately provided. The current output information is selected from the above-mentioned extracted information and the expression of the character is updated at step S99.

For example, a text message "You're almost there, so try harder" is appended to the character on the basic screen just prior to goal attainment. If necessary, a sound of encouragement is output to the SPK 29. In a case where the "Wellness Meter" is declining, on the other hand, the expression of the character is changed to a darker expression and a text message "Have you been loafing recently?" is append to the character at the same time.

Thus, a character on the basic screen not only evolves, grows and moves about the screen in a form (physique, etc.) in accordance with the "Life Gauge" (state of health) but also undergoes a change in expression and exhibits a variety of motions (actions) in accordance with the "Wellness Meter" at this time. It is just as if the character were behaving as an actual living thing. Moreover, the character sleeps when "Sleep Flag"=1 holds.

FIG. 13 illustrates a flowchart of game processing. When the "→" key is pressed on the basic screen, a transition to this game (e.g., slot machine) processing is made. When the wellness of character (i.e., the user) is not good, the game is played to perk up the user. The screen of a slot machine is displayed at step S101. One example of a display screen of a slot-machine game is illustrated in FIG. 19(G). Apples and bananas appear side by side on the screen. This is a screen on which a winning combination has been missed. When three apples line up horizontally, this means a hit on a winning combination. Heart symbols at this time represent the "Wellness Meter" or "Life Gauge".

Input from a key is awaited at step S102. When there is an input from a key, it is determined at step S103 whether the key is a lever key. If the key is the "→" key on the screen of the slot machine, this is the lever key. In case of the lever key, a slot-machine operation based upon random numbers and probability is performed at step S104. The higher the "Wellness Meter", the higher the probability applied; the lower the "Wellness Meter", the lower the probability. The "Wellness Meter" is greatly dependent upon the evaluation of goal attainment rate. When the user loafs and the "Wellness Meter" declines, therefore, a winning combination will not be hit upon unless the user plays the game a lot. Accordingly, if the user exercises today without getting lazy, the "Wellness Meter" rises and so does the probability of winning. Since the "Wellness Meter" fluctuates subtly due to other factors (time index, random numbers, etc.), the timing at which the game is played also is important.

It is determined at step S105 whether the slot-machine operation has hit upon a winning combination. In case of a hit, "Life Gauge" (or the "Wellness Meter" if desired) is incremented by +1 at step S106. If the goal of exercising is attained on this day, is it possible for "Life Gauge" to be incremented by a total of +2. This processing is skipped if a winning combination is missed. A screen showing the results of the slot-machine operation is displayed at step S107. If a winning combination is missed, a screen to this effect is displayed and control returns to the processing of step S102. If the lever key is pressed further, the slot-machine game can be played any number of times. In case of a hit, a screen to this effect is displayed at step S107. In case of a hit, a fanfare is also output at the same time. One example of a hit screen is illustrated in FIG. 19(H). Here three apples line up in a row and the "Life Gauge" is raised from 4 to 5.

With reference again to FIG. 13, processing is exited if it is determined at step S103 that the key is not the lever key.

FIG. 14 is a flowchart of other control processing according to this embodiment.

The character on the basic screen leads an orderly life in which the character rises regularly (e.g., between 5:00 and 7:00 in the morning) and goes to bed regularly (e.g., between 9:00 and 10:00 P.M.).

FIG. 14(A) illustrates a flowchart of rise processing. A transition to rise processing is made when the condition "Actual Time"=5:00 is satisfied, for example. The "Sleep Flag" is set to 0 (the wake-up state) at step S111 and control returns to the validation processing that preceded interrupt processing.

FIG. 14(B) illustrates a flowchart lights-out processing. A transition to lights-out processing is made when the condition "Actual Time"=21:00 is satisfied, for example. The "Sleep Flag" is set to 1 (the sleep state) at step S112 and control returns to the validation processing that preceded interrupt processing.

Further, it is possible for the user to put an awake character to sleep.

FIG. 14(C) illustrates a flowchart of processing for putting a character to sleep. If, say, the "←" key and "→" key are pressed simultaneously on the basic screen where the character is awake ("Sleep Flag"=0), a transition to this sleep processing is made. The "Sleep Flag" is set to 1 (sleep) at step S113 and this processing is exited.

Further, it is possible for the user to wake up a sleeping character.

FIG. 14(D) illustrates a flowchart of processing for waking up a character. If, say, the "←" key and "→" key are pressed simultaneously on the basic screen where the character is sleeping ("Sleep Flag"=1), a transition to this wake-up processing is made. The "Sleep Flag" is set to 0 (awake) at step S114 and this processing is exited.

If the instrument 10 is so adapted that interaction with a sleeping character cannot be performed in a dream, a sleeping character can be awakened by providing this wake-up processing, thereby making possible the interaction of FIG. 12(A).

Furthermore, the user can turn off (pause) the oscillation enumeration processing of the instrument 10 at any time. FIG. 14(E) illustrates a flowchart of pause setting processing. If, say, the "→" key and "OK" key are pressed simultaneously in a state in which "Pause Flag"=0 (no pause) holds, a transition to this pause setting processing is made. The "Pause Flag" is set to 1 (pause) at step S115 and this processing is exited.

The user can turn on (no pause) the oscillation enumeration processing of the instrument 10 at any time. FIG. 14(F) illustrates a flowchart of pause release processing. If, say, the "→" key and "OK" key are pressed simultaneously in a state in which "Pause Flag"=1 (pause) holds, a transition to this pause release processing is made. The "Pause Flag" is set to 0 (no pause) at step S116 and this processing is exited.

Though not illustrated, an arrangement can be adopted in which the character appears in poor humor and cries out unless two or more hours of oscillation are applied between 9:00 A.M. and 6:00 P.M. Furthermore, though not illustrated, a screen display and the required operation described below are possible by pressing a specific key.

The "Name", age, "Life Gauge" and weight, etc., of the user (or character) are displayed in text on a "Status Screen". The age is obtained from the "Date of Birth". The weight is obtained from the form information of the character.

FIG. 20 illustrates a weight conversion table for characters according to this embodiment.

Basically, an n-legged initial state (clay) is converted to 20 g and "n legs; infant; healthy" is converted to 35 g. The units may be kilograms if desired. Conversions are made in similar fashion in the rest of the table. The actual displayed weight is obtained by adding random numbers of ±1 to the results of conversion. Since one is informed of weight by a numerical value and not only of the form of the character, the state of growth and state of health of the character can be recognized numerically.

Further, "Present Attainment Rate", number of days goals were obtained thus far and number of days goals were not obtained thus far are displayed numerically on the "Norm Screen". The number of days goals were obtained and number of days goals were not obtained are accumulated and retained in counters (not shown) in RAM 26. The number of days goals were obtained and number of days goals were not obtained are good criteria for evaluating long-term exercising. "Actual Time" and calories consumed thus far, etc., are displayed on a "Clock Screen". The numerical display of "Actual Time" takes the place of a clock. Further, the value of calories consumed is obtained from "Evaluation Register" or "Cumulative Register". The former represents calories consumed daily and the latter represents total calories consumed after the start of exercising (inclusive of the monitoring period).

The clock can be set on a "Clock Setting Screen" while exercising is in progress.

A "Personal File Pointer" in FIG. 4(A) can be changed on a "User Switching Screen" to change over the personal data file that is to be managed.

Furthermore, the "Sound Flag" can be ON/OFF-controlled by a specific key operation. In case of "Sound Flag"=0 (OFF), sound is not output to the SPK 29. In case of "Sound Flag"=1 (ON), sound is output to the SPK 29. When "Sound Flag"=1 holds, musical notes appear on the right side of the screen, thereby informing the user that sound can be heard.

Figure 21:
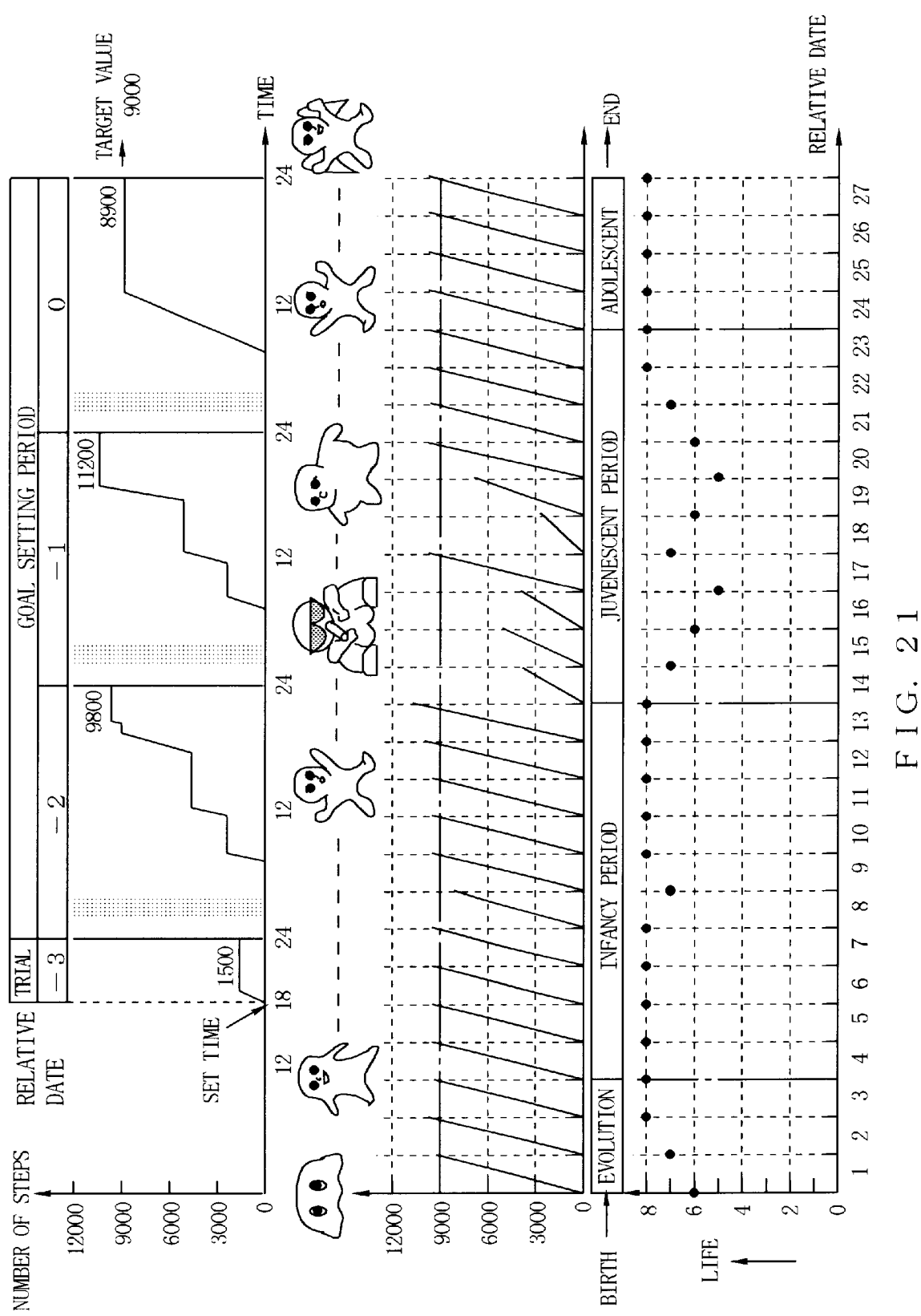
FIG. 21 is a timing chart (1) of walking for training according to this embodiment.
Figure 22:
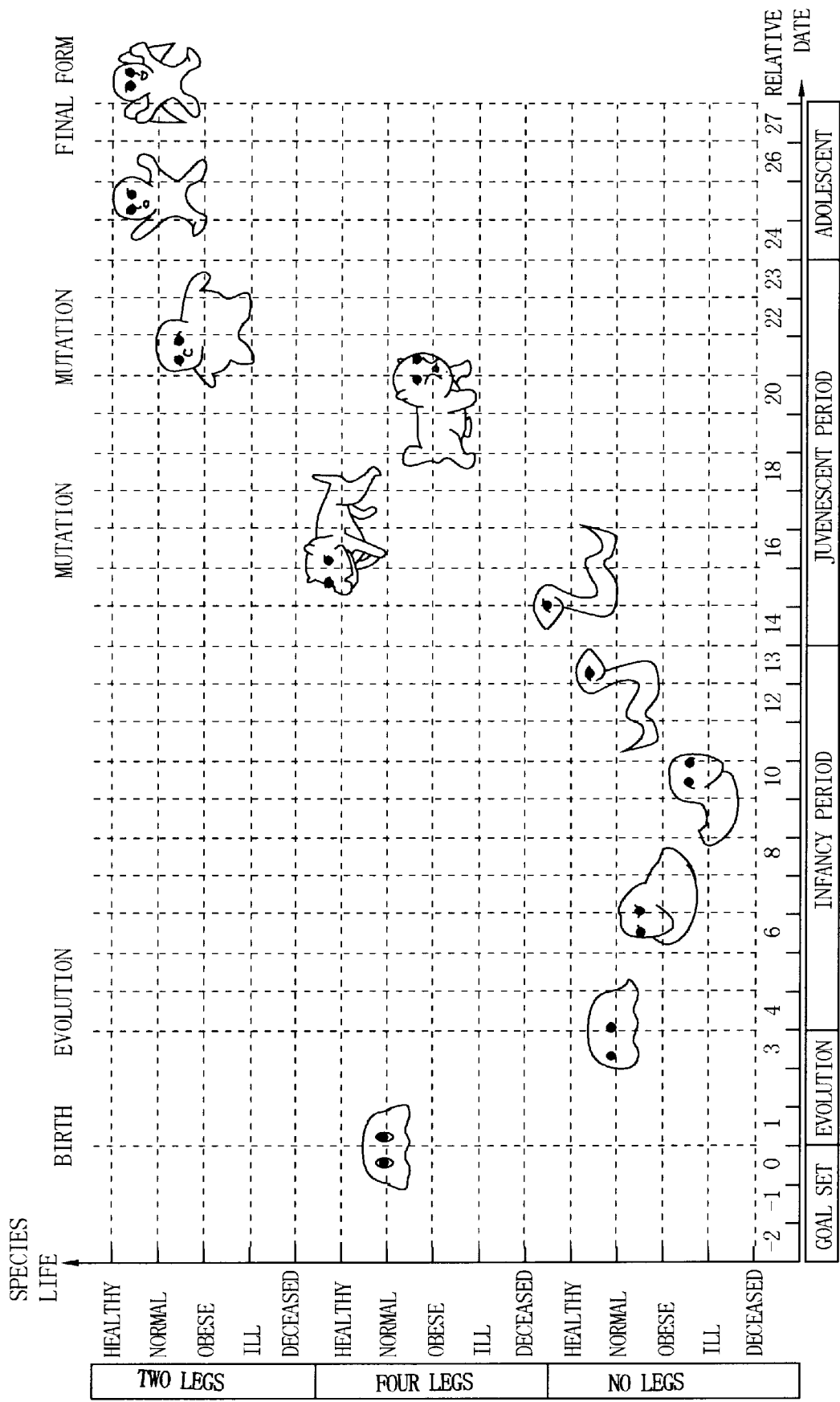
FIG. 22 is a timing chart (2) of walking for training according to this embodiment.

FIGS. 21, 22 are timing charts (1), (2) of walking for training according to this embodiment. FIG. 21 illustrates a case where a character does not undergo mutation.

A target value is set automatically to 9000 steps by monitoring measurement over the three days that precede the start of monitoring. It is unnecessary for the user to count the number of steps taken every day. If the user simply walks (or runs) in a normal manner in accordance with a daily time schedule, the target value will be set. This is convenient. It should be noted that if the user is accustomed to exercising, the user may set the target value manually.

Clay (Life Gauge=6) is born on the first day at the start of exercising, and seeing what species the clay will evolve into over the next three days is enjoyable. If the goal is attained every day, "Life Gauge" rises to 7 or 8. "Life Gauge" peaks at 8. Since the value of "Life Gauge" cannot be put aside as savings, it is important to think ahead and attain the goal every day without over-exerting oneself.

As the result of attaining one's norm faithfully for three days, the character evolves to "two legs; infant; healthy" (Life Gauge=8) on the fourth day. Although the goal is not attained on the eighth day, the period of infancy progresses well overall.

On the 14th day, the character grows to "two legs; juvenile; normal" (life gauge=7). From about this time a slump begins and "Life Gauge" declines steadily day by day. "Life Gauge" falls by the same −1 at goal attainment rates of both 99% and 30%. Perhaps noticing this, the user does almost no exercise other than that necessary for daily life (such as commuting to work or school) during this period. Since the user has engaged in nighttime pleasure-seeking as well, a delinquent character also appears on the screen in random fashion. On the 17th day, therefore, the user tries harder and attains the goal and, in addition, hits upon a winning combination in the slot-machine game, as a result of which "Life Gauge" is elevated by a total of +2 on this day. The user thenceforth manages to persevere and the character grows to "two legs, adolescent, healthy" (life gauge=8) on the 24th day. The user then perseveres further and, as a result, is capable of eventually ending the present exercise regimen in the form "two legs; adolescent; angel".

FIG. 22 shows a case where a character undergoes a mutation.

Clay born on the first day subsequently fails to endeavor sufficiently and, hence, evolves to "no legs; infant; normal" on the fourth day. Effort then remains flat but, in the latter half of the period, the user manages to try harder, as a result of which the character grows in the manner obese→ill→normal in a state in which the character is a legless infant. The character grows to "no legs; juvenile; healthy" on the 14th day. However, a user who has gained strength can no longer find satisfaction in the light exercising perform thus far.

Accordingly, the user strives on days 15 and 16, attains a level that is 1.5 times the norm on these consecutive days and achieves a mutation (warp) to the higher species, i.e., "four legs; juvenile; healthy", on the 17th day. At the same time, the norm is increased by 10%, making the exercising environment more severe. Though the user then tires somewhat, the user gains further strength and, remembering the fun of the warp, strives further on days 20 and 21, attaining a level that is 1.5 times the currently prevailing norm on these consecutive days. As a result, the character experiences a warp from "four legs; juvenile; obese" to a still higher species, i.e., "two legs; juvenile; obese". At the same time, the norm is increased a further 10%, making the exercising environment even more severe. However, since only a few days remain, the user decides to strive and makes the effort. As a result, the user is capable of eventually ending the present exercise regimen in the form "two legs; adolescent; angel".

FIGS. 23 and 24 are diagrams (1), (2) for describing forms of using the exercise assisting meter according to this embodiment.

In FIG. 23(A), the user carries the instrument 10 on his or her waist and walks.

In FIG. 23(B), the user carries the instrument 10 on his or her waist and enjoys a running machine 100 at an athletics center (fitness club) or the like. The instrument 10 senses such exercising effectively and causes this to be reflected in the "Life Gauge".

In FIG. 23(C), a user who has tired of the running machine 100 shifts to a pectoral-muscle (back-muscle) strengthening machine 101 to harden the arm, chest and shoulder muscles, etc.

The machine 101 has a function for servicing an exercise assisting meter like the instrument 10. When the user pulls the bars of the machine together to a prescribed distance or less with both arms, a built-in sensor (switch, etc.) senses this and generates one pulse signal (or a number thereof obtained by calculating the amount of user exercise in terms of number of steps) corresponding thereto. The pulse signal is supplied to the instrument 10, which has been placed on a machine table 101A, via an adapter cable 10B equipped with a common connector. The signal is input to the CPU 21 via the connector jack 36 of the instrument 10. Accordingly, the instrument 10 is capable of effectively sensing not only walking but also exercising that involves such complicated motion and of reflecting this in the "Life Gauge". Thus, almost all repetitive exercise performed by a user can become the object of evaluation by the instrument 10.

In FIG. 24(A), the user is riding a bicycle 102 outside. The bicycle 102 is equipped with a detecting portion (tachogenerator) 60 and meter portion 70 of a speedometer. The meter portion 70 is capable of outputting a pulse signal in which the amount of user exercise involved in pedaling the bicycle is calculated in terms of number of steps walked or ran. The instrument 10 carried by the user receives the pulse signal from the meter portion 70 via the cable 10B and can subject this signal to an evaluation of amount of exercise.

FIG. 24(B) illustrates the structure of the speedometer.

The detecting portion 60 is equipped with a disk 61 the perimeter of which has a plurality of slits 62. The disk 61 is rotated in the direction of arrow a, in unison with the traveling of the bicycle, by a frictional rotation mechanism (not shown) in frictional contact with a wheel. A photocoupler 63 is provided above the slits 62, and a detection signal indicating that slits have passed by is amplified and shaped into a pulse by an amplifier 64. The frequency of the pulse signal varies with the speed of the bicycle; the frequency rises as the speed (i.e., the amount of exercising by the user) increases and falls as the speed (the amount of exercising by the user) decreases.

Under these conditions, a pulse-speed converter 71 counts the number of pulses in a unit time and generates the corresponding speed information. The speed information is indicated digitally on the meter 73. Meanwhile, a pulse-number-of-steps converter 72 frequency-divides an input pulse signal sequence and outputs a pulse signal S at a rate of once per M-number of inputs. By properly selecting the frequency dividing ratio M, the pulse signal S can be generated in such a manner that the pulse period becomes, e.g., 0.5 s or greater when the bicycle is traveling at low speed (e.g., 20 km/h) and less than 0.5 s when the bicycle is traveling at high speed (e.g., 20 km/h). Upon receiving the pulse signal S, the instrument 10 increments the "Walking Counter" or "Running Counter" by +1 in dependence upon the pulse period.

By thus carrying and using the instrument 10, the amount of various daily exercise of the user can be acquired without omission and can be subjected to overall evaluation.

In FIG. 3, the instrument 10 may be provided with the communication unit 37 which relies upon a metal line, light (infrared radiation, etc.) or electromagnetic waves, etc. In such case digital information more useful than simple pulses is received from an external machine or the like via the communication unit 37. For example, absolute ranking information regarding the machine (e.g., the fact that the highest record of an exercise performed using the machine is 100 times) is received beforehand, after which the user challenges the machine and actually exercises to receive information indicative of actual measurement. The instrument 10 evaluates the received actual-measurement information (the number of times the exercise was performed) using 10 grades, for example, and outputs a character image of the corresponding grade as well as a message if required.

In the embodiment described above, operation is described based upon specific numerical values, conditions and pictures (images), etc. However, it goes without saying that the present invention is not limited these numerical values, conditions and pictures (images). For example, the period of an exercise can be set freely to 60 days, 120 days, etc.

Further, in the embodiment set forth above, there is described an example of an exercise assisting meter (a training pedometer) fully equipped with the characterizing features of the present invention. However, it goes without saying that various types of exercise assisting meters can be realized by freely combining components and control relating to one, two or more of the characterizing features of the foregoing embodiment.

Further, in the embodiment set forth above, the "Life Gauge" is incremented by +1 if a hit is achieved in a slot-machine game. However, an arrangement may be adopted in which, if a hit is achieved in the slot-machine game on the condition that "Present Attainment Rate"≧80% holds, the norm of that day is achieved.

Further, in the embodiment set forth above, a mutation occurs in a case where the evaluation of attainment rate over two days is equal to or greater than 150%. However, the condition for a mutation may be any desired condition. For example, an arrangement may be adopted in which a mutation occurs in a case where half the set norm is achieved by running over two consecutive days.

Further, in the embodiment set forth above, a sound comprising a beeping or chime tone is output to the speaker 29. However, an arrangement may be adopted in which a computer-synthesized voice is output by a voice synthesizer.

Though a preferred embodiment of the present invention is described above, it goes without saying that the components, control and combinations thereof may be modified in various ways without departing from the idea of the present invention.

The exercise assisting meter of the present invention as described above manages a relative period, which extends from a reference time, and enumerates the repetitive amount of exercise performed by a user every relative period, and expresses the continuous result of evaluation thereof by image information (a character) of a virtual organism having a plurality of grades. As a result, the user is capable of enjoying exercising (training), which generally tends to be monotonous, together with the present instrument.

Further, in exercising performed over a long period of time, the character is caused to evolve and grow as days pass, for example, the form (state of health, physique) of the character is caused to change in accordance with whether a daily goal is attained or not, and the expression or motion (action) of the character is caused to change based upon an evaluation of daily goal attainment. This makes it possible to enjoy long-term exercising and to properly support the health management of the user. This makes a great contribution to facilitation of user exercising and to management of the user's health.

What is claimed is:

1. An exercise assisting meter comprising:
   an exercise-amount enumeration unit for enumerating amount of repetitive exercise of a user;
   a memory for storing image information on virtual organisms of a plurality of grades;
   a controller for managing a relative period, which extends from a reference time, and retaining a target value of an amount of exercise to be attained within one relative period and, by judging whether or not the goal has been attained, evaluating continuously the amount of exercise enumerated by said exercise-amount enumeration unit in regard to each relative period and selecting a virtual organism of a corresponding grade; and
   a display unit for reading image information on said selected virtual organism out of said memory and displaying this image information on a screen.

2. An exercise assisting meter according to claim 1, wherein the memory stores image information of a plurality of grades relating to species, forms, expressions and/or motion of virtual organisms.

3. An exercise assisting meter according to claim 2, wherein the controller causes the species of a selected virtual organism to evolve or causes the form of the selected virtual organism to grow with a continuous evaluation.

4. An exercise assisting meter according to claim 1, wherein the controller enumerates a cumulative value of amount of exercise performed over a predetermined period of time and obtains a target value based upon a calculation (cumulative value)×[(one relative period)/(predetermined time period)].

5. An exercise assisting meter according to claim 3, wherein the controller manages a life gauge that is for controlling selection of a species or form of a virtual organism and causes the life gauge the next time to be incremented or decremented in accordance with the judgment, made in each relative period, as to whether or not a goal has been attained.

6. An exercise assisting meter according to 1, wherein the controller retains one, two or more goal attainment rates that extend back in time from the present, causes the target value the next time to increase in a case where said one, two or more goal attainment rates exceed a first predetermined threshold value that is greater than 1, and causes the target value the next time to decrease in a case where said one, two or more goal attainment rates fall below a second predetermined threshold value that is less than 1.

7. An exercise assisting meter according to claim 3, wherein the controller retains one, two or more goal attainment rates that extend back in time from the present and causes the selection of the virtual organism the next time to mutate to a species of a superior grade in a case where said one, two or more goal attainment rates exceed a third predetermined threshold value that is greater than 1.

8. An exercise assisting meter according to claim 2, wherein the memory stores image information indicating that a virtual organism is sleeping, and the controller manages actual time and, from a first predetermined time of the previous night to a second predetermined time of the following morning, causes the image information indicative of sleeping to be displayed instead of image information indicating that the virtual organism is awake.

9. An exercise assisting meter according to claim 2, wherein the memory stores image information indicating the conduct of a virtual organism, and the controller manages actual time and, in a case where amount of exercise greater than a predetermined amount is detected within a predetermined period of time at night, the controller causes the image information indicative of said conduct to be displayed by inserting the information or superimposing it at an appropriate timing.

10. An exercise assisting meter according to claim 4, wherein the controller retains date of birth of the user, information representing a comfort index that conforms to the season and/or a mood index that conforms to the time, and manages actual time, actual date and a wellness meter for controlling selection of expression or motion of a virtual organism being displayed on the screen; and said wellness meter is obtained at a suitable timing by a weighted evaluation of a combination of any one, two or more of an evaluation regarding goal attainment rate at the present time and/or on a day in the past, a biorhythm at the present date obtained from said date of birth, said comfort index conforming to said actual date, said mood index conforming to said actual time, and a random number.

11. An exercise assisting meter according to claim 4, further comprising an interaction key for interaction with a virtual organism;
   wherein the memory stores a plurality of items of image information abstractly represent good and bad moods of a virtual organism;

the controller retains date of birth of the user, a comfort index that conforms to the season and/or a mood index that conforms to the time, and manages actual time, actual date and a wellness meter for controlling selection of an interaction response screen; and said wellness meter is obtained at the time of an input from said interaction key by a weighted evaluation of a combination of any one, two or more of an evaluation regarding goal attainment rate at the present time and/or on a day in the past, a biorhythm at the present date obtained from the date of birth, said comfort index conforming to said actual date, said mood index conforming to said actual time, and a random number; and image information abstractly representing said moods corresponding to said wellness meter is displayed on the said response screen.

12. An exercise assisting meter according to claim 9, further comprising an interaction key for interaction with a virtual organism;

wherein the memory stores a message conversion table in which season, date and time and/or evaluation of goal attainment rate at the present time and/or on a day in the past serve as conditions and in which message information regarding greetings, words of encouragement and/or praise, etc., are made to correspond to respective ones of these conditions; and the controller manages the actual time and actual date and, in response to an input from said interaction key, extracts, and displays on said interaction response screen, message information from said message conversion table, said message information conforming to the present date, present time and/or evaluation of goal attainment rate at the present time and/or on a day in the past.

13. An exercise assisting meter according to claim 1, further comprising a prescribed key;

wherein the controller is adapted so as to be capable of activating or deactivating the enumerating operation of the exercise-amount enumeration unit in response to an input from said prescribed key.

14. An exercise assisting meter according to claim 1, wherein the exercise-amount enumeration unit detects time intervals at which a signal relating to the amount of repetitive exercise of the user is generated, evaluates said time intervals by a predetermined threshold value and separately counts signals, which belong to different time intervals, as amounts of exercise of different categories.

15. An exercise assisting meter according to claim 9, wherein the controller is provided with a prescribed game processing function and causes the life gauge or wellness meter to be incremented if the user has won a game.

16. An exercise assisting meter according to claim 4, further comprising a prescribed key; wherein the controller provides a plurality of personal files for managing the relative period, target value and life gauge of the user and changes over a personal file that is the object of management in accordance with an input obtained by operating said prescribed key.

17. An exercise assisting meter according to claim 1, further comprising signal input means coupled to an external exercise measuring device by wire, light or radio, for inputting a signal indicative of detection of repetitive amount of exercise of a user measured by said external exercise measuring unit.

* * * * *